Dec. 27, 1949  D. J. CAMPBELL ET AL  2,492,355
SMOOTHING AND DIFFERENTIATING CIRCUIT
Filed Dec. 30, 1942  6 Sheets-Sheet 2

INVENTORS:
D. J. CAMPBELL
W. G. WING
BY
Paul B. Hunter
ATTORNEY

Dec. 27, 1949  D. J. CAMPBELL ET AL  2,492,355
SMOOTHING AND DIFFERENTIATING CIRCUIT
Filed Dec. 30, 1942  6 Sheets-Sheet 3

INVENTORS:
D. J. CAMPBELL
W. G. WING
BY Paul B. Hunter
ATTORNEY

Dec. 27, 1949     D. J. CAMPBELL ET AL     2,492,355
SMOOTHING AND DIFFERENTIATING CIRCUIT
Filed Dec. 30, 1942     6 Sheets-Sheet 4

INVENTORS:
D. J. CAMPBELL
W. G. WING
BY
ATTORNEY

Curves showing the effect of varying the sensitivity constant ($k_2$) in the differentiating and prediction circuit shown in Fig. 3.

Patented Dec. 27, 1949

2,492,355

UNITED STATES PATENT OFFICE 2,492,355

SMOOTHING AND DIFFERENTIATING CIRCUIT

David J. Campbell, Richmond Hill, and Willis G. Wing, West Hempstead, N. Y., assignors to The Sperry Corporation, a corporation of Delaware Application December 30, 1942, Serial No. 470,686

23 Claims. (Cl. 235—61.5)

1

The present invention relates, generally, to the art of directing gun fire against a moving target, and more particularly, to means for, and methods of, continuously controlling the fire of guns so as to effect hits against rapidly moving targets, such as airplanes.

The velocity and direction of flight of any target may be vectorially represented by any system of three component velocity vectors which are mutually perpendicular to one another. If these component velocity vectors are multiplied by a time equal to the projectile time of flight to the target's future position and then combined vectorially, the prediction, that is, the movement of the target during that time, in the direction of the resultant velocity vector, is obtained. If the resultant prediction is vectorially combined with the target's present position, the correct future position of the target is determined. Hence, it is clear that two of the prime functions of any director are first, to obtain the component time derivatives of the target's motion, and second, to multiply these component rates by a time of flight in order to obtain the corresponding predictions.

Accordingly, all apparatus for the solution of the fire control problem must necessarily include some kind of differentiating or rate measuring device, and also some kind of multiplying or prediction device in order to continuously determine the future position of the target. Since these two devices cooperate to produce a common result, namely, a determination of the target's future position, they will hereinafter be considered together as constituting a unitary circuit, referred to as the differentiating and prediction circuit. These differentiating and prediction circuits are principal components of any director, and critically influence the effectiveness of the instrument.

The over-all effectiveness of any differentiating and prediction circuit may be determined from a consideration of its dynamic characteristics, which consist of the following three factors: (1) settling time, (2) amplitude ratio, and (3) steady state lag error.

The settling time is a measure of how much time the circuit requires to adequately respond, that is, to solve for the predicted position of the target. If the director is predicting in a rectilinear coordinate system, as is the director of the present invention, settling time may be considered as the time after which all response errors are negligible (less than an arbitrary value). For the purpose of computation, time of flight

2 may be assumed constant, and the other input, consisting of a rectilinear coordinate of present target position, may be considered as changing at a constant rate.

The amplitude ratio is a measure of the extent to which spurious perturbations in the present position input data are reflected into the predicted position output data. Because of the impossibility of obtaining perfect tracking of the target resulting from backlash in the gears, and for other reasons, the present position input data contain small erratic variations from the true present position of the target. A differentiating and prediction circuit which will substantially disregard these erratic variations and use only the average of the input data, which average represents the true present position of the target, is said to have good smoothing characteristics, or a low amplitude ratio.

For the purpose of obtaining a comparison between differentiating and prediction circuits with respect to their smoothing characteristics, it is assumed that the erratic variations appear in the form of sine waves superimposed on the true present position input data. Amplitude ratio may be defined as the ratio of the amplitude of the sinusoidal perturbations superimposed on the predicted position output data to the amplitude of the sinusoidal perturbations superimposed on the present position input data, if a fixed perturbation frequency and a constant time of flight are assumed.

Steady state lag error in a differentiating and prediction circuit is a measure of the inherent error which arises in prediction even after sufficient time has elapsed as to nullify all transient response errors. For the purpose of computation, steady state lag error in a rectilinear component of the target's motion may be defined as the error in yards in the rectilinear component of prediction which is effected by a constantly changing time of flight, under the conditions of a specific time of flight and a constant rate of change of present position input data if sufficient time has elapsed to nullify all response errors.

Presently used differentiating and prediction circuits, such as the one disclosed in Patent No. 2,065,303, entitled Apparatus for the control of gunfire, issued December 22, 1936, in the names of E. W. Chafee, H. Murtagh, and S. G. Myers, employ one variable speed device of the conventional disc, ball and cylinder type.

The novel differentiating and prediction circuit of the present invention employs two variable speed devices for differentiating, and an independent dead beat multiplier for multiplying, in such a way that the dynamic characteristics of the circuit are much better than those of any other known prediction circuit.

The steady state lag error, which arises in the differentiating and prediction circuit described in the above-mentioned Patent No. 2,065,303 from the use of a variable speed device for multiplying is eliminated in the present invention by performing the multiplication function in a "dead beat" multiplier, which operates independently of the differentiating circuit. By a "dead beat" multiplier is meant one which instantaneously solves for the true product of the instantaneous values of the two inputs, that is, one which has no inherent lag. The term "dead beat" is used in a similar sense throughout this application.

The differentiating and prediction circuit of the present invention generates smooth measures of both the present position input data and the component rate data, with the result that an amplitude ratio of less than unity may be obtained. Thus, it is possible to produce output data which is smoother than the input data employed. It can be shown that, by a proper choice of circuit constants, the differentiating and prediction circuit of the present invention may be caused to have an amplitude ratio which is only a small fraction of that of the circuit described in the aforesaid Patent No. 2,065,303 when the circuit constants are so selected as to effect a settling time which is substantially equal to that of the prior patent.

It is also proposed in the differentiating and prediction circuit of the present invention to provide means for changing one of the circuit constants during the process of the solution so that a low settling time is obtained during the time of transient response, and a low amplitude ratio will thereafter result. In this way, the circuit will generate accurate data in a minimum amount of time, and will generate accurate and smooth data thereafter.

The over-all effectiveness of any gun director, besides being critically affected by the characteristics of the differentiating and prediction circuit, is also influenced by the completeness and accuracy of the ballistic solution, and by the accuracy of all the other necessary operations, such as adding, subtracting, multiplying, torque amplifying, and solving for a dependent variable through the use of a cam.

Prior gun directors employ very approximate wind and drift corrections, and attempt to correct for variations in air density and muzzle velocity by certain trial fire corrections. It is proposed in the present invention to incorporate a complete ballistic solution, which accurately takes account of all the variables affecting the ballistics.

The present invention obtains an additional improvement over the prior art through the use of dead beat multipliers and dead beat torque amplifiers throughout, thus eliminating inaccuracies and lag in these operations. The accuracy of the director solution is also improved by restricting the use of cams to the function of obtaining corrections. In this way good scale factors can be maintained on all cams, and little power need be taken from them.

In prior gun directors, such as the one disclosed in copending application Serial No. 434,090 for an Anti-aircraft gun directing system, filed March 10, 1942, now abandoned, in the names of E. W. Chafee, C. G. Umsted and L. C. Warner, a correction for fuze dead time is effected by an operator manually matching two dials, one of which is under his control. In the present invention automatic means are provided for correcting for fuze dead time without the necessity for matching dials.

Prior gun directors have been adapted to operate, if desired, with target data received from a radio sight which is located at a distance from the director. The present invention incorporates, as an integral part of the director, a radio sight which may be used instead of the optical sight, if desired. The target data so obtained is automatically set into the director by suitable servo means, thus eliminating errors arising in the transmission of the data and in the manual matching of dials which was previously required to set such data into the director.

Accordingly, the principal object of the present invention is to provide an improved gun director which will function effectively against existing aircraft targets.

Another object of the present invention is to provide a novel gun director with superior dynamic characteristics.

A further object is to provide a mechanical differentiating and prediction circuit in which there exists no steady state lag error.

A still further object of the invention is to provide a mechanical differentiating and prediction circuit which also operates as a very effective smoothing circuit.

An object of the invention is to provide a mechanical differentiating and prediction circuit in which the future position data produced may be smoother than the present position data employed.

Another object is to provide a mechanical differentiating and prediction circuit in which the dynamic characteristics may be altered during the course of the solution so as to obtain a minimum settling time during the time of transient response and a minimum amplitude ratio thereafter.

Another object of the invention is to provide a mechanical differentiating and prediction circuit especially adapted to employ target data generated by a radio position finding system.

An object of the invention is to provide a gun director which incorporates a complete ballistic solution.

Another object is to provide a gun director which attains a very high degree of accuracy through the use of dead beat multipliers and dead beat torque amplifiers throughout, and correction cams with good scale factors, wherever cams are necessary.

A further object is to provide a gun director which incorporates an automatic correction for fuze dead time.

A still further object of the invention is to provide a gun director integrally incorporating both radio and optical sighting means, and radio means for determining the slant range of the target.

Other objects and advantages will become apparent from the specification, taken in connection with the accompanying drawings wherein the invention is embodied in concrete form.

In the drawings.

Similar characters of reference are used in all of the above figures to indicate corresponding parts.

The solution of the fire control problem involves three distinct and independent functions: (1) obtaining continuous data representative of the present position of the target by tracking the target with a suitable sight; (2) employing this present position data in a differentiating and prediction circuit to obtain data representative of the future position of the target; (3) utilizing the future position data in a ballistic mechanism to obtain data for positioning the guns, data for setting the projectile fuze, and time of flight data for the prediction circuit.

Figure 1:
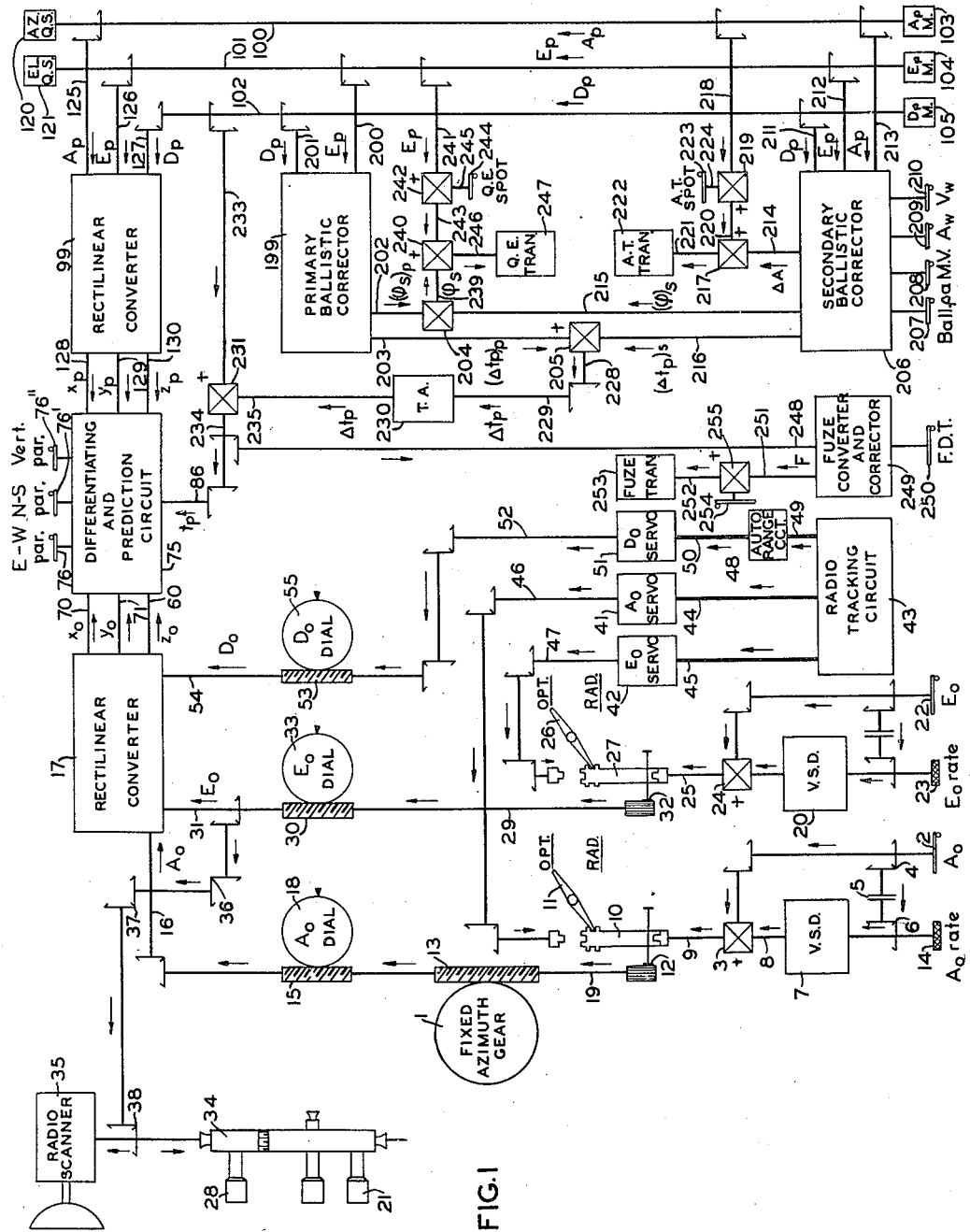
Fig. 1 is a flat schematic diagram showing the principal components of the gun director of the present invention.

Referring to Fig. 1 in which one embodiment of the present invention is shown, the input shafts 16, 31, and 54 to the rectilinear converter 17 are caused to rotate amounts proportional to the present position of the target in azimuth ($A_0$), elevation ($E_0$), and slant range ($D_0$), respectively. In order to accomplish this result, either automatic radio tracking means or manual optical tracking means may be employed, as selectively determined from the position of the clutch control handles 11 and 26.

This present position data, having first been converted to rectangular coordinates in rectilinear converter 17, is then set into the differentiating and prediction circuit 75, which computes the future position of the target. The differentiating and prediction circuit, through electrical connections, not shown in Fig. 1, causes the motors 103, 104 and 105, and consequently the shafts 100, 101, and 102, to rotate amounts proportional to the computed future position of the target in azimuth ($A_p$), elevation ($E_p$) and slant range ($D_p$), respectively.

The future azimuth ($A_p$), elevation ($E_p$) and slant range ($D_p$) data, appearing as proportional rotations of shafts 100, 101 and 102, respectively, are modified in the primary ballistic corrector 199 and secondary ballistic corrector 200 and their associated equipment so as to produce rotations of shafts 221, 246, and 234 proportional to angle of train (A. T.), quadrant elevation (Q. E.) and time of flight ($t_p$). The time of flight ($t_p$) signal is further modified in the fuze converter and corrector 249 to obtain fuze setting (F) data which appears as a proportional rotation of shaft 252. Time of flight ($t_p$) is then set into the differentiating and prediction circuit 75 and angle of train (A. T.), quadrant elevation (Q. E.), and fuze setting (F) data are transmitted to the guns by transmitters 222, 247 and 253, respectively.

As previously pointed out, the three major functions in the solution of the fire control problem, set out in the above paragraphs, are distinct and independent. It is therefore not intended that the novel apparatus and methods disclosed for the accomplishment of any of these functions be limited to use with the apparatus and methods described for the accomplishment of the other functions. In particular, it will be understood that any suitable means for obtaining present target position data might be substituted for the means disclosed without in any way affecting the operation of the novel prediction and ballistic apparatus disclosed.

Referring now to the means disclosed in Fig. 1 for obtaining data representative of the present position of the target, reference numeral 1 designates a fixed azimuth gear fixedly positioned in the support of the director. The remainder of the apparatus shown in Fig. 1 is mounted rotatably with respect to fixed gear 1 and to the director mount, as in prior gun directors.

As previously pointed out, two modes of operation for the control of the director in azimuth and elevation are provided, optical and radio, as selectively determined by the position of the clutch control handles 11 and 26 and clutches 10 and 27.

When clutch 10 is in the optical position, as shown, control of the director in azimuth is obtained from an azimuth control handwheel 2 which serves to directly actuate one member of the differential 3. Operation of azimuth handwheel 2 also actuates, through gearing 4, friction clutch 5 and gearing 6, a variable speed power device 7 whose output shaft 8 is thereby caused to rotate at a rate proportional to the setting of azimuth control handwheel 2. The variable speed drive 7 may be of any suitable type, as, for example, the conventional disc, ball and cylinder type of variable speed device, or a variable displacement hydraulic pump and motor unit, known as the "Vickers" unit.

The motions of control handwheel 2 and of the output shaft 8 of variable speed drive 7 are additively combined in differential 3, whose output shaft 9 is thereby driven at a rate corresponding to the displacement of control handle 2.

With clutch 10 in the optical position, as shown, shaft 9 is connected through clutch 10 and gearing 12 to shaft 19 so as to actuate the worm gear 13. The interaction of worm gear 13 with the fixed azimuth gear 1 causes the rotatable portion of the director to walk around fixed gear 1 and thereby rotate in azimuth. There is thus obtained what is usually termed "aided tracking" in azimuth. If desired, an azimuth rate control knob 14 may be employed to actuate the variable speed drive 7 alone, in which case friction clutch 5 slips.

A second worm gear 15 and the present azimuth input shaft 16 are simultaneously actuated with worm gear 18, thus setting present azimuth ($A_0$)

into the rectilinear converter 17, and providing a visual indication of present azimuth ($A_0$) on dial 18. Thus, in the optical position of clutch 10, present azimuth ($A_0$) data is obtained through the manual operation of handwheel 2 and/or the rate control knob 14, which are manipulated by the azimuth operator so as to maintain his sight 21 on the target.

In a similar manner, an elevation control handwheel 22 and an elevation rate control knob 23 are provided for obtaining present elevation ($E_0$) when the clutch control handle 26 and clutch 27 are in the optical position. In this case, elevation control handwheel 22 and/or the elevation rate control knob 23 provide a similar type of aided tracking by means of the variable speed power drive 20 and the differential 24, whereby the output shaft 25 of differential 24 is rotated an amount corresponding to the present elevation of the target, when the target is being tracked in elevation by means of the elevation telescope 28.

Output shaft 25 operates through clutch 27 and gearing 32 to simultaneously actuate shaft 29, worm gear 30 and the present elevation input shaft 31. In this way, present elevation ($E_0$) is set into the rectilinear converter 17, and an indication of present elevation ($E_0$) is provided on dial 33. The optical sight 34 and radio scanner 35 are also elevated in accordance with present elevation ($E_0$) from shaft 31 so as to track with the target, as by gearing 36, 37 and 38 and their cooperating shafts.

Thus, in the optical position of clutches 10 and 27, it is seen that two operators, by manual operation of the handwheels 2 and 22, cause the sight 34 and scanner 35 to track with the target, and at the same time set present azimuth ($A_0$) and present elevation ($E_0$) into the rectilinear converter 17.

In the radio position of clutches 10 and 27, the servos 41 and 42, operating under the control of the radio tracking circuit 43, automatically perform this same function. The radio tracking circuit 43, which may be of the type described in copending application Serial No. 441,188 for a "Radio gun control system," filed April 30, 1942, in the names of C. G. Holschuh, G. E. White, W. W. Mieher and J. E. Shepherd, is adapted to cooperate with scanner 35 so as to radiate periodic pulses of electromagnetic energy toward the target and to receive back from the target a reflected portion of this energy. The radio tracking circuit 43 is also adapted to interpret the varying magnitude of the received pulses of electromagnetic energy so as to produce, as on output leads 44 and 45, direct voltage signals proportional in magnitude and polarity to the magnitude and sense of the azimuth and elevation tracking error, respectively.

In the radio position of clutch 10, the azimuth servo 41, operating under the control of the azimuth tracking error signal voltage received on lead 44, acts upon shaft 19, through shaft 46, clutch 10 and other appropriate shafts and gearing to maintain the scanner 35 aligned in azimuth with the true line of sight to the target, and to set present azimuth ($A_0$) into the rectilinear converter 17. The azimuth servo 41 may be of any well-known type adapted to produce on its output shaft 46 a rate of rotation proportional in magnitude and sense to the magnitude and polarity of the input voltage signal on lead 44.

Similarly, the elevation servo 42, which may be identical to the azimuth servo 41, operates under the control of the elevation tracking error signal voltage received on lead 45, through shaft 47, clutch 27 and other appropriate shafts and gearing, to cause the scanner 35 to track with the target in elevation, and to set the present elevation ($E_0$) into the rectilinear converter 17.

The third coordinate, slant range ($D_0$), necessary to fully determine the present position of the target, is continuously obtained by radio means and automatically set into the rectilinear converter 17, in both the optical and radio position of clutches 10 and 27.

For this purpose an automatic range circuit 48 is provided, which may be of the type disclosed in copending application Serial No. 375,373 for a "Phase angle indicator," filed January 22, 1941, now Patent No. 2,370,692 of March 6, 1945, in the name of James E. Shepherd. As described in that application, such a circuit, upon receiving information on lead 49 from the radio tracking circuit 43 as to the time delay between the radiation of a pulse of electromagnetic energy and the receipt of the corresponding reflected pulse, is adapted to produce, as on output lead 50, a direct voltage which is proportional to the slant range ($D_0$).

This slant range voltage signal on lead 50 controls the slant range servo 51, which, in this case, should be of the type which is adapted to produce a rotational displacement of its output shaft 52 proportional to the input voltage signal on lead 50. Output shaft 52 actuates worm gear 53 and shaft 54, thereby setting slant range ($D_0$) into the rectilinear converter 17, and providing a visual indication of slant range ($D_0$) on the dial 55.

The rectilinear converter 17, having been supplied with input data determinative of the present position of the target in spherical coordinates, $A_0$, $E_0$, and $D_0$, on shafts 16, 31, and 54, respectively, is adapted to convert this data to the corresponding rectangular coordinate data, $x_0$, $y_0$ and $z_0$, which then appear as proportional rotations of the output shafts 70, 71, and 60, respectively.

Figure 2:
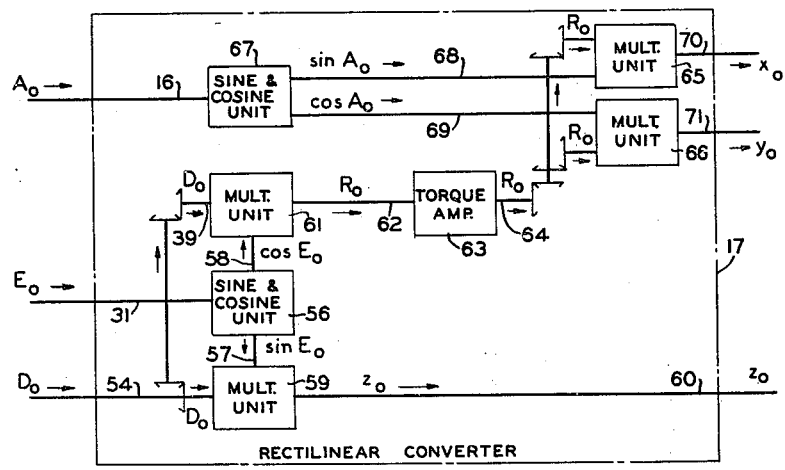
Fig. 2 shows a schematic representation of the rectilinear converters shown in Fig. 1.

The rectilinear converter 17, which is shown in Fig. 2, consists essentially of only two types of components, multiplier units, and sine and cosine units, both of which are dead beat mechanical calculators. The multiplier units are preferably of the type described in prior Patent No. 2,194,477 for Multiplying machines, issued March 26, 1940, in the names of W. L. Maxson and P. J. McLaren. As described in that patent, such a multiplier unit is adapted to produce a rotation of its output shaft instantaneously equal to or proportional to the product of the rotations of its two input shafts.

The principal element of the above-mentioned Patent No. 2,194,477 is a spiral gear having teeth mounted thereon in such a path that a crown gear in contact with these teeth is driven at a speed proportional to the square of the speed at which the spiral gear is driven. The sine and cosine units in rectilinear converter 17 preferably consist of two such spiral gears, the path traced out by the teeth of each of which is modified such that in one case, the rotation of the driven crown gear is proportional to the sine of the rotation of the spiral gear, and in the other case, the rotation of the driven crown gear is proportional to the cosine of the rotation of the spiral gear. The Maxson sine and cosine unit is a well-known device of this character.

Referring again to Fig. 2, present elevation ($E_0$) data is supplied to the sine and cosine unit 56, as by shaft 31. The sine and cosine unit 56 calculates sin E₀ and cos E₀, and transmits sin E₀ to the multiplier unit 59, as by shaft 57, and transmits cos E₀ to the multiplier unit 61, as by shaft 58. Multiplier unit 59, having also received slant range ($D_0$), as on shaft 54, produces, as a proportional rotation of its output shaft 60, the vertical coordinate ($z_0$) of the present target position, which is the product $D_0 \sin E_0$.

Similarly the horizontal component ($R_0$) of slant range ($D_0$), which is the product of $D_0$, received on shaft 39, and cos $E_0$, received on shaft 58, is obtained in multiplier unit 61, and is transmitted to the dead beat torque amplifier 63 by shaft 62. The torque amplifier 63 may be of any suitable type adapted to produce, as on output shaft 64, a torque amplified signal ($R_0$) which is identical to the input signal ($R_0$) on shaft 62, but for its greater torque. The well-known torque amplifying device, consisting of contacts, a capacitance motor and a Lancaster damper, is preferably used for this purpose. The torque amplified signal ($R_0$), appearing on shaft 64, is then transmitted to the multiplier units 65 and 66.

Sine and cosine unit 67, having received present azimuth ($A_0$) on shaft 16, calculates sin $A_0$ and cos $A_0$, and transmits sin $A_0$ to the multiplier unit 65, as on shaft 68, and transmits cos $A_0$ to the multiplier unit 66, as on shaft 69. Multiplier unit 65, having received sin $A_0$ from the sine and cosine unit 67 and $R_0$ from the torque amplifier 63, produces, as a proportional rotation of its output shaft 70, the east-west coordinate ($x_0$) of the present position of the target, which is the product $R_0 \sin A_0$. Similarly, multiplier unit 66, having received cos $A_0$ from the sine and cosine unit 67 and $R_0$ from the torque amplifier 63, produces, as a proportional rotation of its output shaft 71, the north-south coordinate ($y_0$) of the present position of the target, which is the product $R_0 \cos A_0$.

The functions of the differentiating and prediction circuit 75, shown in Fig. 1, are to convert the received present position data taken with respect to the director, to corresponding present position data, taken with respect to the guns; to smooth and differentiate the resulting present position data; to compute the future position of the target; and to control the operation of motors 103, 104, and 105 such that the shafts 100, 101, and 102, are rotated amounts proportional to the future position of the target in terms of future azimuth ($A_p$), future elevation ($E_p$), and future slant range ($D_p$), respectively.

The future position data, represented in terms of spherical coordinates by the rotations of shafts 100, 101, and 102, are transmitted, as by shafts 125, 126, and 127, respectively, to the future position rectilinear converter 99, which then computes the corresponding rectangular coordinates, $x_p$, $y_p$ and $z_p$, and transmits this data to the differentiating and prediction circuit 75 by shafts 128, 129, and 130, respectively. The future position rectilinear converter 99 may be identical to the present position rectilinear converter 17, as shown in Fig. 2.

Figures 3, 8, 9, 10:
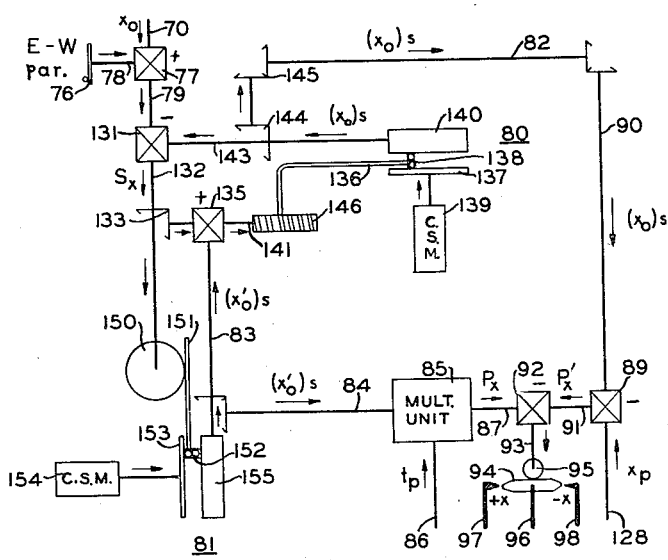
Fig. 3 is a schematic representation of the mechanical differentiating and prediction circuit of the present invention.
Fig. 8 illustrates a modification of the mechanical differentiating and prediction circuit, shown in Fig. 3, in which one of the circuit constants may be manually altered during the process of solution.
Fig. 9 shows a detail of Fig. 8.
Fig. 10 illustrates a modification of the circuit shown in Fig. 3 in which one of the circuit constants is automatically altered during the course of the solution.

The differentiating and prediction circuit 75 consists of three identical components, one for each of the rectangular coordinates, $x$, $y$ and $z$. Referring to Fig. 3, in which the $x$ component of the differentiating and prediction circuit 75 is shown, an E-W parallax handwheel 76 is provided for setting into the differential 77, as by shaft 78, an input proportional to the distance from the guns to the director in the east, or positive $x$, direction. This input is additively combined in differential 77 with the E-W coordinate ($x_0$) of the present position of the target, received on input shaft 70, to produce on shaft 79 the $x_0$ coordinate taken with respect to the guns rather than with respect to the director. Similar handwheels 76′ and 76″ are provided, as shown in Fig. 1, in order to introduce N-S and vertical parallax corrections, into the $y$ and $z$ components respectively, of the differentiating and prediction circuit 75.

As will later be described in detail, the variable speed devices 80 and 81 operate in conjunction with the various gearing and differentials shown, to produce on shaft 82 a rotation proportional to a smoothed version ($x_0$)$_s$ of $x_0$, and on shaft 83 a rotation proportional to a smoothed version ($x'_0$)$_s$ of the time derivative of $x_0$. The multiplier unit 85, which is also preferably of the type disclosed in previously mentioned Patent No. 2,194,477, produces on shaft 87 a rotation proportional to the computed prediction in the $x$ direction ($P_x$), which is the product of ($x'_0$)$_s$, received on shaft 84, and time of flight ($t_p$), received on input shaft 86.

The difference differential 89 subtracts ($x_0$)$_s$, received on shaft 90, from $x_p$, received on input shaft 128, and produces the director prediction ($P'_x$) as a proportional rotation of shaft 91. The director prediction ($P'_x$) on the shaft 91 is then subtracted from the computed prediction ($P_x$) on shaft 87 in the prediction follow-up differential 92, the difference, if any exists, appearing as a proportional rotation of output shaft 93.

The motion of output shaft 93 actuates a suitable contact making device, represented here in simple form as a rack 94, positioned by the pinion 95, thus energizing either conductor 97 or 98 from conductor 96, depending on the direction of rotation of shaft 93. As will be more fully explained hereinafter, the selective energization of conductor 97 or 98 causes a repositioning of shafts 100, 101 and 102 by motors 103, 104 and 105 such that the director prediction ($P'_x$) eventually becomes equal to the computed prediction ($P_x$), at which time the displacement of shaft 93 is zero, and neither conductor 97 nor 98 is energized.

The $y$ and $z$ components of the differentiating and prediction circuit 75 operate identically and simultaneously so that the positions of the shafts 100, 101, and 102 are caused to continuously represent the future position of the target as computed by the differentiating and prediction circuit 75.

Figure 4:
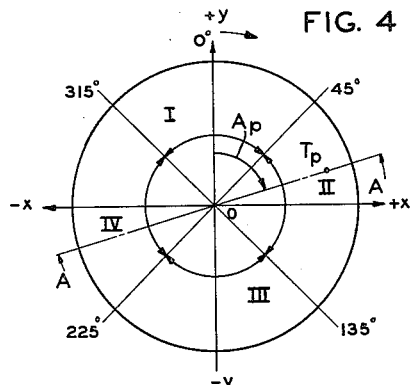
Figs. 4 and 5 are diagrams useful in explaining the theory of operation of the electrical system employed in the present invention.
Figure 5:
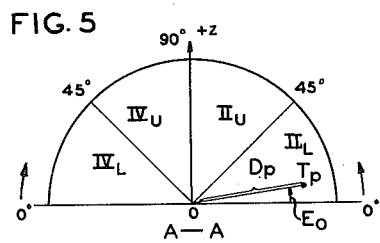

It is obvious that in order to cause $P'_x$ to become equal to $P_x$, it will be more effective to actuate one or another of the three motors 103, 104, and 105 depending on the future position of the target. This is clearly illustrated in Figs. 4 and 5, which are a plan view and an elevation view, respectively, of the spatial position of the guns and the target, in which the guns are represented by the point O, and the future position of the target by the point $T_p$. As there shown, the hemisphere may be divided into equal 90° quadrants I, II, III and IV depending on the value of $A_p$. These four quadrants are each subdivided into a lower and upper section depending on the value of $E_p$. Thus, the future position of the target $T_p$, as shown, is in quadrant II$_L$, that is, the lower section of the second quadrant. With the future position of the target so located, in order to achieve a positive increase in the $x$-component of the future position (a positive increase in $P'_x$), it is most effective to drive the slant range ($D_p$) motor in the positive direction. Likewise, in this case, a positive increase in $P'_y$ can best be obtained by a negative increment in $A_p$ and a positive increase in $P'_z$ by a positive increment in $E_p$.

The following table summarizes the motor and the direction of rotation of that motor which will be most effective in driving in positive predictions in the $x$, $y$ and $z$ directions when the future position of the target lies in the quadrant and section indicated.

| Quadrant | $+x$ | $+y$ | $+z$ |
|---|---|---|---|
| $I_{Lower}$ | $+A_p$ | $+D_p$ | $+E_p$ |
| $I_{Upper}$ | $+A_p$ | $-E_p$ | $+D_p$ |
| $II_L$ | $+D_p$ | $-A_p$ | $+E_p$ |
| $II_U$ | $-E_p$ | $-A_p$ | $+D_p$ |
| $III_L$ | $-A_p$ | $-D_p$ | $+E_p$ |
| $III_U$ | $-A_p$ | $+E_p$ | $+D_p$ |
| $IV_L$ | $-D_p$ | $+A_p$ | $+E_p$ |
| $IV_U$ | $+E_p$ | $+A_p$ | $+D_p$ |

Negative increments in prediction are obtained, in each case, by a rotation of the same motor as is indicated in the above table for positive increments, but in an opposite direction.

Rotation of the proper motor in the correct direction, as indicated in the above table, is obtained through the operation of the azimuth quadrant switch 120 and elevation quadrant switch 121, which are similar in purpose to the quadrant switch described in the aforesaid Patent No. 2,065,303. These switches and their cooperating electrical system are shown schematically in Fig. 6.

The azimuth quadrant switch 120 is shown as consisting of three identical four-pole double-throw switches 116, 117 and 118, each of which is indirectly actuated from a single azimuth cam 400. It will be understood that the cam 400 is rotated according to future azimuth ($A_p$) from the future azimuth shaft 100. As indicated by the direction of the arrow, the cam 400 is rotated in a clockwise direction as future azimuth increases and in an opposite direction as future azimuth decreases, one complete revolution of the cam representing 360° in future azimuth, so that for every future azimuth position there is a corresponding position of the cam, as indicated by the fixed index 401. Thus, the cam, as shown, is in the zero azimuth position.

As cam 400 rotates from its 0° position to its 90° position, the follower 402 is displaced upwardly in two successive steps, the first step occurring slightly before the 45° position is reached, and the second slightly after the 45° position is passed. The displacement of follower 402 actuates lever 403, which is pivoted at point 404, and said lever in turn actuates the control member 405 of switch 117, thus switching said switch from position "I" to position "II." Switch 117 is of any well-known type having the characteristic that in order for it to be thrown in either direction, the control member 117 must be displaced the total distance corresponding to the sum of the two successive displacements of follower 402. As a result switch 117 will not throw exactly at the 45° position of cam 400, but rather at a point slightly past such position in the direction in which the cam is rotating. This delayed action control is a desirable feature in order to prevent rapid transfer of control of the motors, in case the future position ($T_p$) of the target should oscillate about a division line between any of the four quadrants. As can readily be seen, cam 400 is laid out in such a way that switch 117 is in position "I" when the future position of the target ($T_p$) is in quadrants I or IV, and in position "II" when the future position of the target is in quadrants II or III.

Switches 116 and 118 are similarly placed under the control of the position of cam 400 through cam followers 402' and 403' and their associated control equipment, which operate identically to the follower 402 and its associated control equipment. Thus, switch 116 is in position "I–II" in quadrants I or II and in position "III–IV" in quadrants III or IV, and switch 118 is in position "III" in quadrants II or III and in position "IV" in quadrants I or IV.

The elevation quadrant switch 121 consists of a single four-pole double-throw switch 119, identical to switch 117, and a cam 406, which cam controls the position of switch 119 according to the future elevation ($E_p$) of the target. It will be understood that cam 406 is actuated from the future elevation shaft 101 such that its position at any time corresponds to the future elevation ($E_p$) as indicated opposite the fixed index 401'. Switch 119 is placed under the control of the position of cam 406 through the action of cam follower 407, lever 408 and switch control member 409 which operate identically to the corresponding equipment in the azimuth quadrant switch 120. As can be seen, switch 119 will be in its "L" position in the lower section of each of the four quadrants and in its "U" position in the upper section of each of the quadrants.

Figure 6:
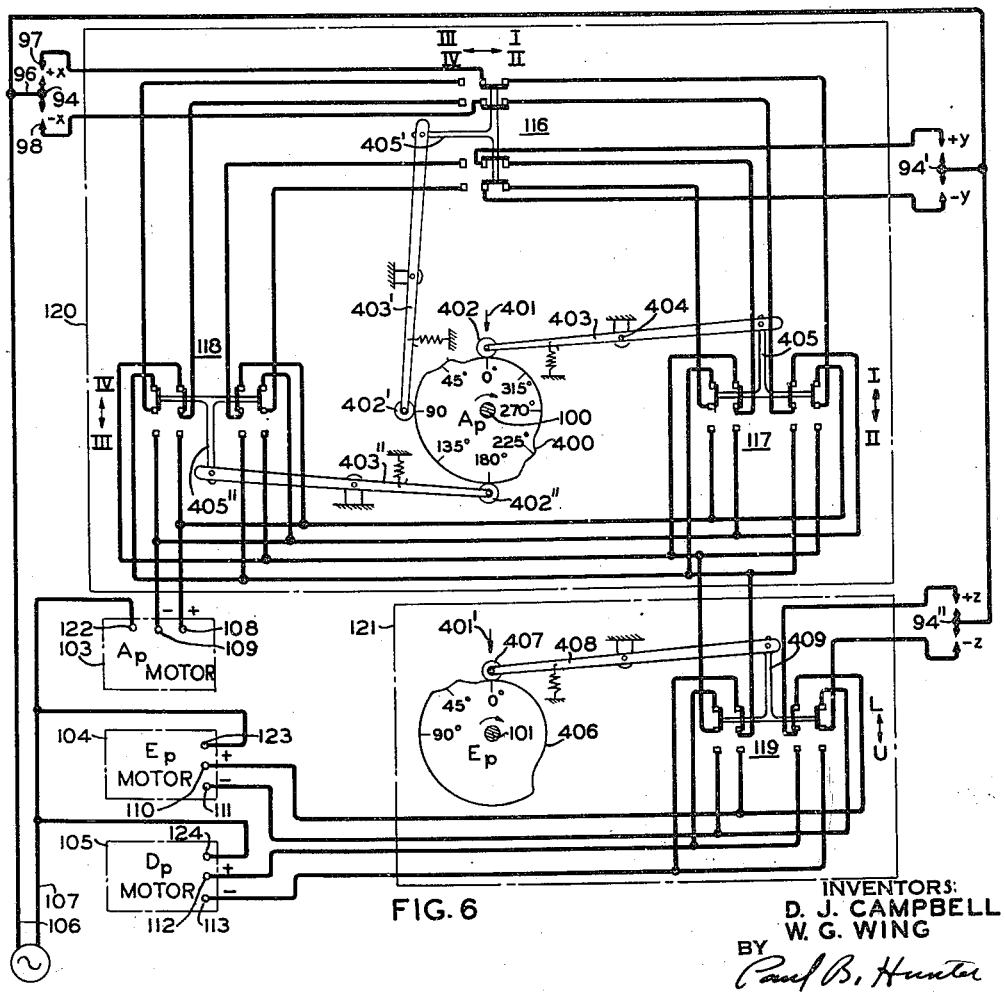
Fig. 6 is a wiring diagram showing the electrical connections between components of the gun director shown in Fig. 1.

As shown in Fig. 6, the terminals 122, 123 and 124 of motors 103, 104 and 105, respectively, are each connected to conductor 107, which is connected to one side of the power supply. Conductor 106, which is connected to the other side of the power supply, is connected to the motor terminals 108 or 109, 110 or 111, and 112 or 113, depending on the position of the switches 116, 117, 118, and 119 and the contact-making racks 94, 94' and 94" of the differentiating and prediction circuit 75.

Energization of terminals 108, 110 and 112 from conductor 106 produces a rotation of the motors 103, 104 and 105, respectively, in the positive direction of the corresponding spherical coordinate, whereas energization of the terminals 109, 111, and 113 produces rotation of the respective motors in the negative direction. As can be seen by tracing the circuits through, the motors 103, 104, and 105 are thus placed under the control of the differentiating and prediction circuit 75 in the desired manner as indicated by the above table.

Referring back to the differentiating and prediction circuit 75 shown in Fig. 3, it was previously stated that the two variable speed devices 80 and 81 operate on the parallax corrected $x_0$ signal, appearing as a proportional rotation of shaft 79, to produce, as a proportional rotation of shaft 82, a smoothed $(x_0)_s$ signal in which the spurious perturbations contained in the $x_0$ input signal have been averaged out, and on shaft 83 a rotation proportional to the smoothed time derivative $(x'_0)_s$ of $x_0$. The manner in which this is accomplished will now be described.

The $x$ component ($x_0$) of the present position, as indicated by the angular position of the shaft 79, is connected into the equating differential 131, the output shaft or control member 132 of which is positioned in accordance with the difference between the rotational displacement of the input shafts 79 and 143. The angular position of shaft 132 represents a useful signal $(S_x)$, as will later be seen. Shaft 132 positions the ball carriage 152 of the variable speed device 81 through pinion 150 and rack 151. As is well known, ball carriage 152 transmits the motion of the disc 153, which is driven by the constant speed motor 154, to the cylinder 155, in such a way that the rate of rotation of the cylinder 155 is proportional to the displacement of the ball carriage 152 from the center of the disc 153.

The rotation of the cylinder 155 is connected, as by the $(x'_0)_s$ shaft 83, into a second differential 135, the other input of which is supplied from shaft 132 through gearing 133. The output of differential 135, which is the algebraic sum of its two inputs, actuates the shaft 141 and the cam 146, the follower or control member 136 of which positions the ball carriage 138 of a second variable speed device 80. The cam 146 is so designed that there is just sufficient non-linearity between the rotation of the cam 146 and the resulting displacement of the follower 136, to correct for the inherent slip in variable speed device 80.

The ball carriage 138 of the variable speed device 80 variably transmits the rotation of the disc 137, which is driven by the constant speed motor 139, to the cylinder 140. The cylinder 140 actuates the $(x_0)_s$ shaft 143, which provides the subtractive input to the equating differential 131.

In considering the operation of the circuit, it will first be assumed that the variable speed device 81 and the differential 135 are omitted, and that the shaft 141 is directly actuated from shaft 132. The circuit would then constitute the ordinary differentiating circuit, which would reach a condition of equilibrium when the ball carriage 138 had assumed such a position that the angular rate of rotation of shaft 143 was equal to the angular rate of rotation of the input $x_0$ shaft 79. At equilibrium the angular position of shaft 141 and cam 146 would represent the time derivative $(x')$ of $x_0$, smoothed to a certain extent. Shaft 143 would be actuated in accordance with $x_0$, also smoothed to a certain extent, but it would lag $x_0$ so that it could not be employed as a source of $(x_0)_s$ data.

By incorporating the additional variable speed device 81 in the circuit, the lag is automatically removed from the $(x_0)_s$ shaft 143 so that its angular displacement is an accurate smoothed indication of the input $x_0$. Also, a much more effectively smoothed time derivative $(x'_0)_s$ of the input $x_0$ is obtained as a proportional rotation of the $(x_0')_s$ shaft 83.

With the variable speed device 81 incorporated in the circuit, the circuit will no longer reach equilibrium when the rate of rotation of shaft 143 first equals that of shaft 79, because at this time the shaft 132 and consequently the ball carriage 152 of the variable speed device 81 will be displaced an amount proportional to the previously mentioned angular displacement lag of shaft 143 with respect to shaft 79. Therefore, at this time the cylinder 155 is still rotating, and will continue to act through the differential 135 to rotate shaft 141 and thereby further displace the ball carriage 138 of variable speed device 80, with the result that the rate of rotation of shaft 143 will begin to exceed that of shaft 79.

The output shaft 132 of the equating differential 131 will then begin to rotate in a direction opposite to its original rotation so as to drive the ball carriage 152 back to the position of zero displacement. Therefore, it is seen that in the novel differentiating circuit of the present invention equilibrium will only be reached when the rate of rotation of shaft 143 equals that of shaft 79, and when there is no angular displacement lag between the two shafts, that is, when the shaft 132 and the ball carriage 152 have returned to their zero displacement positions.

Since a condition for equilibrium in the present circuit is that there be no angular displacement lag of shaft 143 with respect to the $x_0$ input shaft 79, it is apparent that the angular displacement of the $(x_0)_s$ shaft 143 is proportional to a smoothed or average $x_0$.

Also since the rate of rotation of shafts 143 and 79 are equal at equilibrium, the angular displacement of shaft 141 is proportional to a smoothed version of the time derivative of $x_0$, as in the ordinary differentiating circuit which does not incorporate the additional variable speed device 81. At equilibrium, however, it was seen that shaft 132 which provides one input to differential 135 had returned to the position of zero displacement, so that the total angular displacement of shaft 141 must have been produced from shaft 83, which is the other input to the differential 135. Therefore, the angular displacement of shaft 83 is also proportional to a smoothed time derivative $(x'_0)_s$ of $x_0$.

Also, since the shaft 83 does not respond to changes in the time derivative of $x_0$ as quickly as does the shaft 141, the time derivative $(x'_0)_s$ of $x_0$ obtained as a proportional rotation of shaft 83 is more effectively smoothed than the time derivative of $x_0$ which appears as a proportional rotation of shaft 141, and which was obtained in the ordinary differentiating circuit employing only one variable speed device. Besides providing a more effectively smoothed $(x_0')_s$ signal, shaft 83 also is capable of supplying a greater amount of torque than is the $(x_0')_s$ shaft in the ordinary differentiating circuit which corresponds to shaft 141 in the present circuit, since shaft 83 is driven by the constant speed motor 154, whereas the corresponding $(x_0')_s$ shaft in the ordinary differentiating circuit is driven from the input $x_0$ shaft 79 alone.

The use of the above described smoothing and differentiating circuit in the prediction circuit of the present invention results in lower amplitude ratios, or in lower settling times for the same amplitude ratios, than have previously been obtained.

The differentiating and prediction circuit 75, shown in Fig. 3, can be quantitatively analyzed with respect to its dynamic characteristics from a consideration of the differential equation for the circuit. This equation is found to be as follows:

$$\frac{d^2 x_p}{dt^2} + \frac{1}{K_1}\frac{dx_p}{dt} + \frac{x_p}{K_1 K_2} = \left[\frac{1}{K_1} + \frac{t_p}{K_1 K_2}\right]\frac{dx_0}{dt} + \frac{x_0}{K_1 K_2}$$

wherein $K_1$ is the proportionality constant for the variable speed device 80, being equal to the ratio of an increment in the angular displacement of shaft 141 to the resulting increment in the angular velocity of shaft 143, and $K_2$ is the similar proportionality constant for the variable speed device 81, being equal to the ratio of an increment in the angular displacement of shaft 132 to the resulting increment in the angular velocity of shaft 83, and $x_p$ is the sum of $P_x$, appearing on shaft 87, and $(x_0)_s$, appearing on shaft 90.

In the following we have set forth a derivation of the foregoing differential equation, assuming that the circuit comprises a perfect servo and that there is no slip in the variable speed drive. It will be noted that in Fig. 3 we have illustrated a spiral drum-type cam for moving the ball carriage of the variable speed drive 80 in translation. The purpose of this cam is to compensate for slip in the variable speed drive, and, for a perfect, non-slipping variable speed drive, the lead on the spiral cam would be constant. In deriving the above differential equation, we will assume either that there is no slip of the variable speed drive or that the cam is correctly calibrated to compensate therefor.

As illustrated in Fig. 3 and as hereinbefore pointed out, the output shaft 93 of differential 92 operates electrical contacts which control a servo motor for driving shaft 128 or putting in the $x_p$ term into differential 89. The servo is so controlled that the $x_p$ term driven into the differential thereby is such that $$(x_0')_s t_p = x_p - (x_0)_s \quad (1)$$

If we assume a perfect servo, then $x_p$ can be expressed as $$x_p = (x_0)_s + (x_0')_s t_p \quad (2)$$

For simplicity in derivation of this differential equation, let the input be designated by $x_0$; in place of $(x_0)_s$, let us use $x_1$; and substitute "V" for the term $(x_0')_s$. Hence, Equation 2 can be written as follows:

$$x_p = x_1 + V t_p \quad (3)$$

The sensitivity constant, $K_2$, is defined by the following equation:

$$x_0 - x_1 = K_2 \frac{dx_2}{dt}$$

Substituting "$p$" to denote $$\frac{d}{dt}$$

and subsequently employing $p^2$ to denote $$\frac{d^2}{dt^2}$$

the foregoing equation may be written as follows:

$$x_0 - x_1 = K_2 p x_2 \quad (4)$$

The sensitivity constant, $K_1$, is defined by the following equation:

$$x_0 - x_1 + x_2 = K_1 p x_1 \quad (5)$$

The proportionality factor which relates $x_2$ and V is necessarily equal to $K_1$ and, therefore, we can write the equation $$x_2 = K_1 V \quad (6)$$

Substituting the value of $x_2$ from Equation 6 into Equations 4 and 5, respectively, we have $$x_0 - x_1 = K_1 K_2 p V \quad (7)$$

$$x_0 - x_1 + K_1 V = K_1 p x_1 \quad (8)$$

Equation 7 may be transposed to read in terms of $x_1$ as follows:

$$x_1 = x_0 - K_1 K_2 p V \quad (9)$$

and substituting the value of $x_1$ represented by Equation 9 into Equation 8 provides us with the equation:

$$K_1 K_2 p^2 V + K_2 p V + V = p x_0 \quad (10)$$

Solving Equation 10 for V, we obtain $$V = \frac{p x_0}{K_1 K_2 p^2 + K_2 p + 1} \quad (11)$$

When the value of $x_1$ represented by Equation 9 is substituted into Equation 3, we obtain the following equation:

$$x_p - x_0 = (t_p - K_1 K_2 p) V \quad (12)$$

Substituting the value of "V" from Equation 11 into Equation 12 provides us with $$x_p - x_0 = (t_p - K_1 K_2 p) \frac{p x_0}{K_1 K_2 p^2 + K_2 p + 1} \quad (13)$$

Equation 13 may be simplified as follows:

$$(K_1 K_2 p^2 + K_2 p + 1) x_p = (K_1 K_2 p^2 + K_2 p + 1) x_0 + (t_p - K_1 K_2 p) p x_0 \quad (14)$$

and $$(K_1 K_2 p^2 + K_2 p + 1) x_p = (K_2 + t_p) p x_0 + x_0 \quad (15)$$

Multiplying Equation 15 by $$\frac{1}{K_1 K_2}$$

results in the following:

$$\left(p^2 + \frac{1}{K_1} p + \frac{1}{K_1 K_2}\right) x_p = \left(\frac{1}{K_1} + \frac{t_p}{K_1 K_2}\right) p x_0 + \frac{x_0}{K_1 K_2} \quad (16)$$

Since $$p^2 = \frac{d^2}{dt^2} \text{ and } p = \frac{d}{dt}$$

Equation 16, by substituting these values, may be transformed in the following form:

$$\frac{d^2 x_p}{dt^2} + \frac{1}{K_1} \frac{dx_p}{dt} + \frac{x_p}{K_1 K_2} = \left[\frac{1}{K_1} + \frac{t_p}{K_1 K_2}\right] \frac{dx_0}{dt} + \frac{x_0}{K_1 K_2} \quad (17)$$

which is the differential equation hereinbefore set forth as a quantitative analysis of the circuit shown in Fig. 3.

Figure 7:
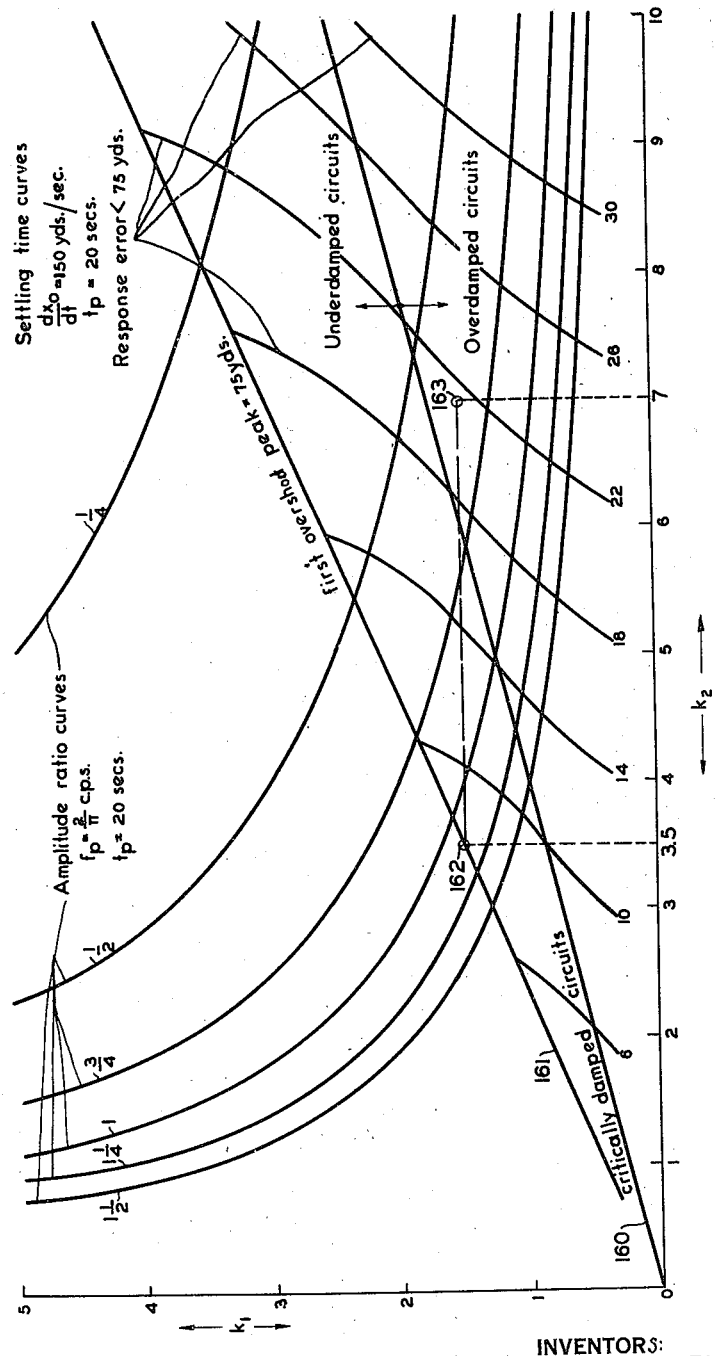
Fig. 7 is a system of curves which show the effect of varying the constants of the mechanical differentiating and predicting circuit, shown in Fig. 3, on the dynamic characteristics of the circuit.

From a solution of the above differential equation it is possible to plot the curves shown in Fig. 7, from which the settling time in seconds and the amplitude ratio of the circuit may be quantitatively obtained for particular values of the circuit constants $K_1$ and $K_2$.

The settling time curves are based on a constant rate of change of the $x$ coordinate of the present position of the target $$\frac{dx_0}{dt}$$

equal to 150 yards per second, a constant time of flight equal to 20 seconds, and a negligible response error in $x_p$ defined as an error of less than 75 yards. The amplitude ratio curves are based on a constant perturbation frequency of $$\frac{2}{\pi} \text{ cycles per second}$$

and a constant time of flight equal to 20 seconds. The settling times and amplitude ratios are as indicated on the respective curves.

As shown, the circuit may have under damped or over damped response characteristics depending on whether values of the circuit constants $K_1$ and $K_2$ are chosen so as to be operating above or below the line 160, each point on which represents a critically damped circuit. The line 161 is the locus of all the points representing the under damped circuits in which the first overshoot peak is equal to 75 yards. The settling time curves are not plotted above this line since, as previously stated, the settling time curves are based on a negligible response error defined as an error of less than 75 yards.

It would be desirable to alter the dynamic characteristics of the circuit during the solution of the fire control problem so as to obtain a low settling time during the time of response and a low amplitude ratio thereafter. From a consideration of the curves shown in Fig. 7, it is apparent that this can conveniently be accomplished by a suitable alteration in the circuit constants, such as doubling the constant $K_2$ from 3.5 during the time of response to 7.0 thereafter. Thus, with a constant value of $K_1$, the quick acting circuit, represented by point 162, having a settling time of 8.12 seconds and an amplitude ratio of 1.12 may be converted, after the time of response, to the good smoothing circuit, represented by point 163, having a settling time of 21.1 seconds and an amplitude ratio of 0.65. Similar results could be obtained employing various relationships between the initial and final values of the circuit constants $K_1$ and $K_2$. The values indicated are illustrative only, and are not to be construed in a limiting sense.

In Fig. 8 there is shown a modification of the differentiating and prediction circuit shown in Fig. 3 which incorporates manual means for decreasing the speed of disc 153 of the variable speed device 81 by half, after the period of response, thus doubling the circuit constant $K_2$ and producing the desired improvement in the smoothing characteristics of the circuit. Thus, when the circuit constant is increased by decreasing the speed of disc 153 of the variable speed device 81, the sensitivity of said variable speed device is decreased or, in other words, the rapidity with which the variable speed device responds to the input signal and synchronizes its output to the input is decreased. Hence, when the sensitivity is so decreased, the smoothing characteristics of the circuit are improved.

As shown in Fig. 8, the constant speed motor 154 drives shaft 164 which supplies one input to the differential 165, the output of which drives the disc 153 of variable speed device 81 as by shaft 170. Shaft 169, which supplies the other input to the differential 165, is also actuated by the constant speed motor 154, as by shafts 164 and 166, friction clutch 167, and shaft 168 and the associated gearing, when the smoothing pushbutton 175 is pressed in. In the normal outer position of the pushbutton 175, however, the brake shoe 172 is caused to exert sufficient pressure, generated by spring 174, on the brake drum 171 to cause the clutch 167 to slip when shaft 166 attempts to drive shaft 168.

Thus, in the normal outer position of the smoothing pushbutton 175, only the input shaft 164 of the differential 165 is driven by the constant speed motor 154. However, when the pushbutton is pressed in, both input shafts 164 and 169 of the differential 165 are driven equally by the constant speed motor 154, so that the disc 153 is driven at twice the rate at which it is driven when the pushbutton is released.

In operation, the pushbutton is maintained in its inner position by the operator during the time of response of the circuit. It is then allowed to return to its normal position decreasing the speed of the disc 153 by half and doubling the circuit constant $K_2$.

The solution indicator 177, having a visual indicating dial 181 (see Fig. 9), is provided in order to indicate to the operator when the circuit has reached a condition of equilibrium, that is, when it has fully responded. Shaft 176, actuated by shaft 132 provides the $x$ solution indication ($S_x$) input signal to the solution indicator. As previously explained, the angular displacement of shaft 132, and consequently of shaft 176, approaches zero as the differentiating circuit approaches equilibrium, that is, the condition of full response.

The $S_x$ indicator 178 on the solution indicator dial 181, shown in Fig. 9, is positioned by shaft 176 so that the $S_x$ indicator approaches the zero index position 182 as the $x$ component of the differentiating circuit approaches equilibrium. The $S_y$ indicator 179 and $S_z$ indicator 180 are similarly positioned from the corresponding shaft of the $y$ and $z$ components of the differentiating and prediction circuit 75. In this way the operator is provided with an indication of the duration of the period of response, so that he may know when to improve the smoothing characteristics of the circuit by releasing the pushbutton 175. The indices 183 may be used to provide an arbitrarily chosen point in the process of response which is considered close enough to the condition of equilibrium for the release of pushbutton 175. The information provided on the solution indicator dial 181 is also useful as a check on the operation of the director.

In Fig. 10 there is shown another modification of the differentiating and prediction circuit shown in Fig. 3, in which the circuit constant $K_2$ is automatically doubled after the circuit has fully responded. From the differential equation for the circuit, it can be shown that the period of response for the circuit with fixed circuit constants is substantially constant irrespective of the particular problem being solved.

This convenient characteristic is utilized in the apparatus shown in Fig. 10 in which a time delay device automatically controls the changeover to a better smoothing circuit after the constant period of response has elapsed. Thus, the operator initiates the operation of the circuit by pressing the pushbutton 185. The inward motion of the pushbutton 185 operates a switch (not shown) in the time delay circuit 191, which switch closes the circuit 186, 187 allowing the battery 188 to energize the control solenoid 189. The plunger 190 is thereby pulled within the solenoid 189, releasing the brake shoe 172' from the brake drum 171 and allowing the shaft 168 to rotate and contribute to the rotation of disc 153, as before.

The time delay circuit, which may be any of the well-known types, either mechanical or electrical, automatically maintains the switch within the time delay circuit 191 in its closed position for the predetermined constant period of response of the circuit, after which period it automatically opens the switch, deenergizing control solenoid 189 and allowing the compression spring 174' to force the shoe 172' against the drum 171, thereby preventing rotation of shaft 168 and decreasing the angular velocity of disc 153. In this way the circuit constant $K_2$ is automatically doubled after the circuit has fully responded so as to improve the smoothing characteristics of the circuit.

It will be understood that in both the manual change-over control system, shown in Figs. 8 and 9, and in the automatic change-over control system, shown in Fig. 10, the shaft 170 also actuates the disc in both the $y$ and $z$ components of the differentiating and prediction circuit 75 corresponding to the disc 153 in the $x$ component shown, so that only one such control system need be provided. Accordingly, in the manual system of Figs. 8 and 9, the operator would release the pushbutton 175 when all three of the solution indicators 178, 179 and 180, corresponding to the solution indication signals $S_x$, $S_y$ and $S_z$, respectively, have settled within the indices 183.

The third phase of the fire control problem involves applying certain modifications, or ballistic corrections, to the future azimuth ($A_p$), future elevation ($E_p$) and future slant range ($D_p$) data appearing as proportional rotations of shafts 100, 101 and 102, respectively, of Fig. 1 so as to obtain angle of train (A. T.), quadrant elevation (Q. E.) and fuze setting (F) for the guns, and time of flight ($t_p$) for the differentiating and prediction circuit 75.

These corrections can be considered as comprising primary ballistic corrections, obtained in the primary ballistic corrector 199, which are made up of those corrections which exist under standard atmospheric conditions and a standard muzzle velocity, and secondary ballistic corrections, obtained in the secondary ballistic corrector 206, which are those corrections necessary to compensate the primary ballistic corrections for variations from standard atmospheric conditions and from standard muzzle velocity. Both the primary and secondary ballistic corrections have experimentally been found to be functions of future elevation ($E_p$) and future slant range ($D_p$).

Referring to Fig. 1, the sequence of application of these corrections so as to obtain angle of train (A. T.), quadrant elevation (Q. E.), fuze setting (F) and time of flight ($t_p$) will now be considered. The primary ballistic corrector 199, having received future elevation ($E_p$) and future slant range ($D_p$), as on shafts 200 and 201, respectively, is adapted, as will further be described in detail, to produce a rotation of output shaft 202 proportional to the primary super-elevation correction ($\phi_s$)$_p$, and a rotation of output shaft 203 proportional to the primary time of flight correction ($\Delta t_p$).

The secondary ballistic corrector 206, which will later be described in detail, receives future azimuth ($A_p$), future elevation ($E_p$), and future slant range ($D_p$) on shafts 213, 212, and 211, respectively, and has set into it percent variation from standard ballistic air density on handwheel 207, variation from standard muzzle velocity on handwheel 208, azimuthal wind direction on handwheel 209 and wind velocity on handwheel 210. Having received this data, the secondary ballistic corrector 206 is adapted to produce azimuth correction ($\Delta A$) as a proportional rotation of shaft 214, secondary super-elevation correction ($\phi_s$)$_s$ as a proportional rotation of shaft 215, and secondary time of flight correction ($\Delta t_p$)$_s$ as a proportional rotation of shaft 216.

The azimuth correction ($\Delta A$) on shaft 214 provides one input to differential 217, the other input being actuated in accordance with future azimuth ($A_p$) from shaft 218 operating through differential 219 and shaft 220. The output shaft 221 of differential 217 positions the rotor of the angle of train transmitter 22, which then transmits angle of train (A. T.) to the guns. An angle of train spotting handwheel 223 is provided in order to enable the operator to introduce arbitrary spots into the angle of train data transmitted to the guns. This arbitrary spot is obtained by modifying the rotation of the output shaft 220 of differential 219 by the rotation of the second input shaft 224 resulting from operation of the handwheel 223.

The primary superelevation correction ($\phi_s$)$_p$, appearing on shaft 202, and the secondary superelevation correction ($\phi_s$)$_s$, appearing on shaft 215, are additively combined in the differential 204, the output shaft 239 of which is thus rotated an amount proportional to the total superelevation correction ($\phi_s$). Shaft 239 drives one input member of differential 240, the other input member of which is driven in accordance with future elevation ($E_p$) from shaft 241 operating through differential 242 and shaft 243. The output shaft 246 of differential 240 positions the rotor of the quadrant elevation, transmitter 247, which then transmits quadrant elevation (Q. E.) to the guns. A quadrant elevation spotting handwheel 244 is provided which acts in conjunction with shaft 245 and differential 242 to allow arbitrary spots to be introduced into the quadrant elevation data transmitted to the guns.

The primary time of flight correction ($\Delta t_p$)$_p$, appearing as a proportional rotation of shaft 203, and the secondary time of flight correction ($\Delta t_p$)$_s$, appearing as a proportional rotation of shaft 216, are additively combined in differential 205 to produce on shafts 228 and 229 the total time of flight correction ($\Delta t_p$). The torque of shaft 229 is amplified in the torque amplifier 230 so as to produce on shaft 235 a rotation which is also proportional to the total time of flight correction ($\Delta t_p$), but having a greater torque than does shaft 229. The torque amplifier 230 may be identical to the torque amplifier used in rectilinear converter 17, or it may be of any other suitable dead beat type.

Shaft 235 provides one input to the differential 231 which input modifies the basic slant range ($D_p$) input received on shaft 233, so as to produce on output shaft 234 a rotation proportional to the time of flight ($t_p$). Output shaft 234 actuates shaft 86 thus providing time of flight ($t_p$) data for the differentiating and prediction circuit 75. Shaft 234 also actuates shaft 248 providing time of flight ($t_p$) data for the fuze converter and corrector 249.

Fuze converter and corrector 249, upon also having set into it fuze dead time (F. D. T.), as from handwheel 250, is adapted to produce on shaft 251 a rotation proportional to the fuze setting (F), as will later be described in detail. Shaft 251 operates through the differential 255 to position the shaft 252. Shaft 252 then positions the rotor of the fuze transmitter 253 which transmits fuze setting (F) to the guns. The fuze spotting handwheel 254, acting in conjunction with differential 255, provides a means of introducing arbitrary spots into the fuze setting (F) which is transmitted to the guns.

The angle of train, quadrant elevation, and fuze setting transmitters 222, 247 and 253, respectively, may be any of the well-known types of self-synchronous transmitters.

Figure 11:
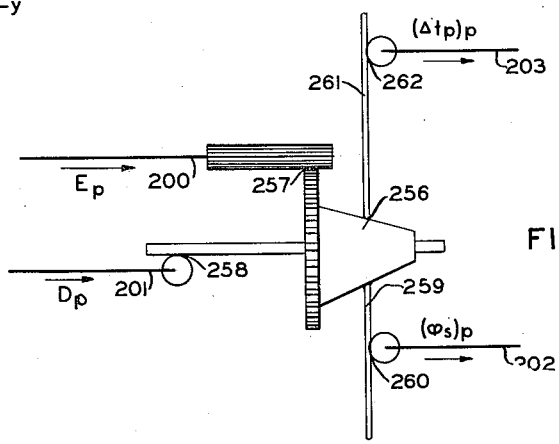
Fig. 11 is a representation of the primary ballistic corrector shown schematically in Fig. 1.

Referring now to Fig. 11, it is seen that the principal element of the primary ballistic corrector 199 is a three-dimensional cam 256, the opposite surfaces of which are respectively used to obtain the primary superelevation correction ($\phi_s$)$_p$ and the primary time of flight correction ($\Delta t_p$)$_p$. Cam 256 is rotated in accordance with future elevation ($E_p$), as by input shaft 200 and gearing 257, and is translated in accordance with future slant range ($D_p$), as by input shaft 201 and gearing 258. The cam is so designed as to produce displacements of its followers 259 and 261 proportional to the primary superelevation correction ($\phi_s$)$_p$ and the primary time of flight correction $(\Delta t_p)_p$, respectively. The linear displacement of follower 259 is converted to a proportional rotation of the $(\phi_s)_p$ output shaft 202 as by gearing 260, and the linear displacement of follower 261 is converted to a proportional rotation of the $(\Delta t_p)_p$ output shaft 203 as by gearing 262.

Figure 12:
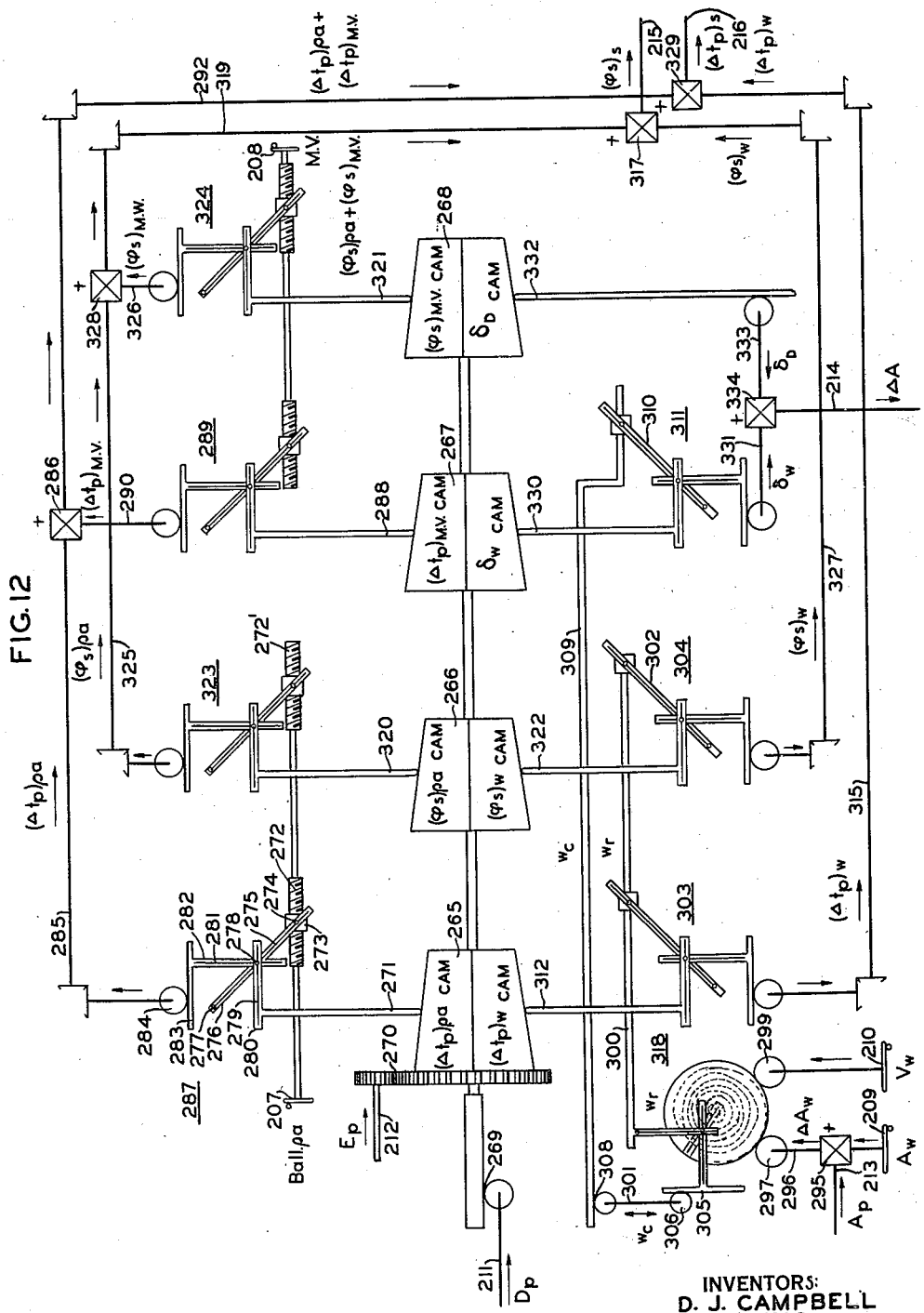
Fig. 12 is a representation of the secondary ballistic corrector shown schematically in Fig. 1.

Referring now to Fig. 12, in which the secondary ballistic corrector 206 is schematically illustrated, there are shown four three-dimensional cams 265, 266, 267 and 268, the opposite surfaces of each of which each provide one secondary ballistic correction so that the four cams provide eight secondary ballistic corrections in all. The four three-dimensional cams 265, 266, 267 and 268 are all rotated in accordance with future elevation $(E_p)$, as by input shaft 212 and gearing 270. The four cams are also simultaneously translated in accordance with future slant range $(D_p)$, as by input shaft 211 and gearing 269.

The follower 271 of the upper surface of cam 265 is linearly displaced an amount proportional to the secondary ballistic correction $(\Delta t_p)_{\rho a}$, which should be applied to the primary time of flight correction $(\Delta t_p)_p$ to compensate for unit percentage variation from standard ballistic air density. The displacement of follower 271 is then multiplied by a factor proportional to the actual percentage variation from standard ballistic air density, as set in by handwheel 207, in the multiplying device 287, so as to produce a linear displacement of the rack element 283 proportional to the secondary time of flight correction $(\Delta t_p)_{\rho a}$ necessary to compensate for the actual percentage variation from standard ballistic air density.

Multiplying device 287 is here shown as a linkage multiplying unit, although any other suitable type of multiplying device could be used. The actual percentage variation from standard ballistic air density is set in by rotation of the handwheel 207, which causes proportional rotations of the worm gears 272 and 272'. The resulting rotation of worm gear 272 produces a proportional linear displacement of the riding gear element 273. A pin 274 on the riding gear element 273 engages a slot 275 in the proportionality element 276, which element is pivoted about the point 277. Another pin 278 engages the slot 275 in the proportionality element 276, and also engages a slot 281 in the vertical extension 282 of the rack element 283, and a slot 279 in the horizontal extension 280 of the follower 271.

In operation, the displacement of the riding gear element 273, produced by rotation of handwheel 207, causes a proportional change in the slope of proportionality element 276. Since the slope of the proportionality element 276 determines the proportionality factor between the displacement of follower 271 and rack element 283, the rack element 283 is linearly displaced an amount proportional both to the linear displacement of follower 271 and to the rotation of handwheel 207.

The linear displacement of rack element 283 is therefore proportional to the secondary ballistic time of flight correction $(\Delta t_p)_{\rho a}$ corresponding to the actual ballistic air density. The linear displacement of rack element 283 is converted to a corresponding rotational displacement of shaft 285 as by gearing 284, the rotation of shaft 285 thus representing $(\Delta t_p)_{\rho a}$. The ballistic air density referred to is a fictitious air density, which takes into account also the temperature of the air, so that $(\Delta t_p)_{\rho a}$ also compensates for variations from standard air temperature.

Similarly, the upper surface of cam 267 is so designed that the linear displacement of follower 288 is proportional to the secondary time of flight correction $(\Delta t_p)_{M. V.}$ necessary to compensate for unit variation from standard muzzle velocity. The displacement of follower 288 is multiplied in the linkage multiplying unit 289 by a factor proportional to the actual variation from standard muzzle velocity, which is set in by rotation of the handwheel 208, so as to produce on shaft 290 a rotation proportional to $(\Delta t_p)_{M. V.}$ necessary to compensate for the actual variation from standard muzzle velocity.

The linear displacement of follower 312, which is caused to represent the secondary ballistic correction $(\Delta t_p)_W$ for unit velocity of rear wind by the design of the lower surface of cam 265, is multiplied in the linkage multiplying unit 303 by a factor proportional to the actual rear wind velocity $(W_R)$, which appears as a proportional rotation of the cross-member 300, so as to produce on shaft 315 a rotation proportional to the secondary ballistic correction $(\Delta t_p)_W$ necessary to compensate for the actual rear wind velocity.

$(\Delta t_p)_{\rho a}$ on shaft 285 and $(\Delta t_p)_{M. V.}$ on shaft 290 are additively combined in the differential 286 so as to produce their sum $(\Delta t_p)_{\rho a}+(\Delta t_p)_{M. V.}$ as a proportional rotation of shaft 292. This sum is then additively combined with $(\Delta t_p)_W$ from shaft 315 in differential 329 so as to produce on output shaft 216 a rotation proportional to the total secondary ballistic correction $(\Delta t_p)_s$ necessary to compensate the primary ballistic correction $(\Delta t_p)_p$ for variations from standard atmospheric conditions and standard muzzle velocity.

The rear wind velocity $(W_R)$ and the cross wind velocity $(W_C)$ are obtained as proportional displacements of the cross-members 300 and 309, respectively, through the operation of the disc and slide mechanism 318 which receives, as input data, the velocity of the wind $(V_W)$ and the azimuthal direction of the wind $(A_{Aw})$ relative to future azimuth $(A_p)$. The disc and slide mechanism 318 may be of the same type as is employed in the aforesaid Patent No. 2,065,303 for resolving the polar coordinates $(R_0)$ and $(A_0)$ of the present position of the target in the horizontal plane into their corresponding rectilinear coordinates $(x_0)$ and $(y_0)$.

The lower spiral disc of the disc and slide mechanism 318 is rotated proportionally to the wind velocity $(V_W)$, as set in by the handwheel 210, through gearing 299. The future azimuth $(A_p)$, received on input shaft 213, is subtracted in differential 295 from the azimuthal wind direction $(A_W)$, as set in by the handwheel 209, and the difference $(\Delta A_W)$ is produced as a proportional rotation of shaft 296. Both the lower spiral disc and the upper slotted disc of disc and slide mechanism 318 are shown schematically as being rotated proportionally to $(\Delta A_W)$ from shaft 296 through gearing 297.

As is well known, the rack element 305 will then be linearly displaced an amount proportional to the $V_W \cos \Delta A_W$, or to the cross wind velocity $(W_C)$, and the horizontal element 300 which operates into the linkage multiplying units 303 and 304 will be linearly displaced an amount proportional to $V_W \sin \Delta A_W$, or to wind velocity $(W_R)$. The horizontal element 309 which operates into the linkage multiplying unit 311 is linearly displaced an amount proportional to the cross wind velocity $(W_C)$ by the linear displacement of the rack element 305 operating through the gearing 306, shaft 301 and gearing 308.

The followers 320, 321 and 322 are linearly displaced amounts proportional to the secondary ballistic correction $(\phi_s)_{p\,a}$ necessary to compensate for unit percentage variation from standard ballistic air density, to the secondary ballistic correction $(\phi_s)_{M.\,V.}$ necessary to compensate for unit variation from standard muzzle velocity and to the secondary ballistic correction $(\phi_s)_W$ necessary to compensate for unit rear wind velocity, respectively. The linear displacements of followers 320, 321 and 322 are respectively multiplied in linkage multiplying units 323, 324 and 304 by factors proportional to the actual percentage variation from standard ballistic air density, the actual variation from standard muzzle velocity, and the actual rear wind velocity (WR), respectively, so as to produce on shafts 325, 326 and 327 rotations proportional to the secondary ballistic correction $(\phi_s)_{p\,a}$, the secondary ballistic correction $(\phi_s)_{M.\,V.}$, and the secondary ballistic correction $(\phi_s)_W$, respectively, corresponding to the actual conditions of ballistic air density, muzzle velocity and rear wind velocity, respectively.

The secondary ballistic corrections $(\phi_s)_{p\,a}$ and $(\phi_s)_{M.\,V.}$ appearing on shafts 325 and 326, respectively, are additively combined in differential 328 so as to produce on shaft 319 a rotation proportional to their sum $(\phi_s)_{p\,a} + (\phi_s)_{M.\,V.}$. This sum is additively combined with the secondary ballistic correction $(\phi_s)_W$, appearing on shaft 327, in differential 317 so as to produce on output shaft 215 the total secondary ballistic correction $(\phi_s)$.

The lateral deflection correction $(\delta_W)$ necessary to compensate for unit cross wind velocity (Wc) is obtained as a linear displacement of the follower 330 of 267. The linear displacement of follower 330 is then multiplied by a factor proportional to the actual cross wind velocity (Wc) in linkage multiplying unit 311 so as to produce, as a proportional rotation of shaft 331, the true lateral deflection correction $(\delta_W)$ necessary to compensate for the actual cross wind velocity (Wc).

The drift correction $(\delta_D)$, which is a function of (Ep) and (Dp) only, and is, therefore, in reality, a primary ballistic correction, is produced as a linear displacement of follower 332 of cam 268. The linear displacement of follower 332 is converted to a proportional rotation of shaft 333, which rotation is therefore also proportional to the drift correction $(\delta_D)$. The drift correction $(\delta_D)$, on shaft 333, and the lateral wind deflection $(\delta_W)$, appearing on shaft 331, are additively combined in differential 334 so as to produce on output shaft 214 a rotation proportional to the total azimuth correction $(\Delta A)$.

Thus it is seen that the secondary ballistic corrector 206 operates to produce, as proportional rotations of output shafts 214, 215 and 216, respectively, the total azimuth correction $(\Delta A)$, the total secondary superelevation correction $(\phi_s)_s$, and the total secondary time of flight correction $(\Delta t_p)_s$.

Figure 13:
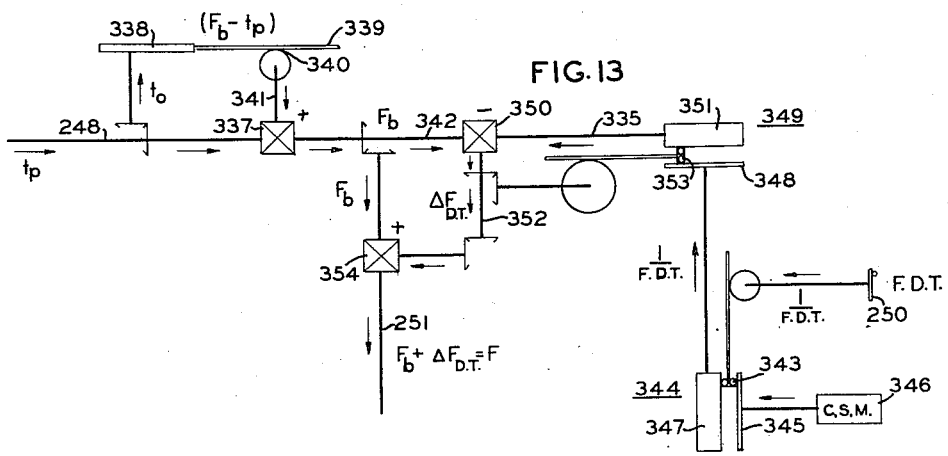
Fig. 13 is a representation of the fuze converter and corrector shown schematically in Fig. 1.

Referring now to Fig. 13, in which the fuze converter and corrector 349 is shown, one input of the differential 337 is actuated in accordance with time of flight $(t_p)$ received on shaft 248. Shaft 248 also rotates the flat correction cam 338, which is so designed that its follower 339 is then linearly displaced an amount proportional to the correction $(F_b - t_p)$ necessary to convert time of flight $(t_p)$ into the corresponding ballistic fuze setting $(F_b)$. The linear displacement of follower 339 is converted, by gearing 340, to a corresponding rotational displacement of shaft 341, which is also proportional to the correction $(F_b - t_p)$, and which provides the other input to the differential 337. Thus the output shaft 342 of differential 337 is continuously rotated an amount proportional to ballistic fuze setting $(F_b)$, which is the sum of the two inputs $(t_p)$ and $(F_b - t_p)$ to the differential 337.

As is well known, a certain amount of time (the fuze dead time) elapses between the cutting of the fuze and the firing of the projectile, and fuze dead time (F. D. T.) depending on the proficiency of the gun crew. Therefore, a dead time correction $(\Delta F_{D.\,T.})$ must be added to the ballistic fuze setting $(F_b)$ to obtain the true fuze setting $(F)$. Since the true fuze setting $(F)$ is equal to what the ballistic fuze setting $(F_b)$ would be at the time of firing, that is, after the F. D. T. has elapsed, the correction $(\Delta F_{D.\,T.})$ is in reality a fuze setting prediction, and the problem can be handled as in any prediction solution.

The fuze setting prediction circuit is similar to that used in previously mentioned prior Patent No. 2,065,303 for obtaining the future position of the target in the $x$, $y$ and $z$ directions. The ball carriage 343 of the variable speed device 344 is displaced a distance from the center of the disc 345 proportional to $$\frac{1}{F.\,D.\,T.}$$

as set in by the operation of the F. D. T. handwheel 250. As the disc 345 of the variable speed device 344 is driven at a constant speed by the constant speed motor 346, the cylinder 347 is caused to rotate at a speed proportional to $$\frac{1}{F.\,D.\,T.}$$

The disc 348 of a second variable speed 349 device is driven from the cylinder 344 so as to also rotate at a speed proportional to $$\frac{1}{F.\,D.\,T.}$$

Shaft 342, whose rotation is proportional to $F_b$ provides one input to the equating differential 350, the other input member of which is driven from the cylinder 351 of the second variable speed device 349, as by shaft 335. The rotation of the output shaft 352 of the equating differential 350 produces a proportional linear displacement of the ball carriage 353.

As is well known, when the circuit has reached equilibrium, the rate of rotation of shaft 342 is equal to the rate of rotation of cylinder 351, and the displacement of ball carriage 353 is directly proportional to the rate of rotation $$\frac{(dF_b)}{dt}$$

of the cylinder 351 and the shaft 342 and inversely proportional to the rate of rotation $$\left(\frac{1}{F.\,D.\,T.}\right)$$

of the disc 348. Therefore, the linear displacement of ball carriage 353, and consequently the rotational displacement of shaft 352, is proportional to the product $$\frac{dF_b}{dt} \times F.\,D.\,T.$$

or to the required dead time correction $(\Delta F_{D.\,T.})$. The correction $(\Delta F_{D.\,T.})$ is then additively combined in the second differential 354 with the ballistic fuze setting ($F_b$) from shaft 342 so as to produce on the output shaft 251 a rotation proportional to the true fuze setting (F').

If desired, a more accurate differentiating and prediction circuit, similar to that shown in Fig. 3 for the determination of $x_p$, could be used in place of the fuze setting prediction circuit shown in Fig. 13. However, it is thought that the accuracy required in obtaining the small fuze dead time correction ($\Delta F_{D.\,T.}$) does not warrant the additional complications involved in the use of the more accurate circuit. Also, the advantages obtained by the use of such a circuit in obtaining $x_p$ are not all applicable to the problem of correcting the ballistic fuze setting ($F_b$) for F. D. T. For example, F. D. T. is a constant, whereas time of flight ($t_p$) was continuously varying, so that no steady state lag error can arise in the fuze setting prediction circuit. Also the input data ($F_b$) does not contain the erratic variations which were contained in ($x_o$) so that a smoothing of data is not required.

In copending application Serial No. 434,090 for an Anti-aircraft gun directing system, filed March 10, 1942, in the names of E. W. Chafee, C. G. Umstead and L. C. Warner, the ballistic fuze setting ($F_b$) was corrected for F. D. T. in a similar manner to that described in the present invention. However, as described in that application, the ball carriage corresponding to ball carriage 353 of the present invention had to be manually positioned by the F. D. T. operator so as to match two dials which were actuated by shafts corresponding to shafts 342 and 335, respectively. It was not possible to use an equating differential, such as the differential 350 of the present invention, because the ballistic fuze setting ($F_b$) shaft, corresponding to shaft 342, was driven from a cam follower and consequently did not have sufficient torque to drive through an equating differential to position the ball carriage 353.

In the present invention, however, the ballistic fuze setting ($F_b$) input shaft 342 is driven substantially from the $D_p$ motor 105, except for small correction components of its rotation provided by correction cams, and therefore has sufficient torque to allow the automatic correction for fuze dead time, incorporated in the present invention, to be used.

It will be noted that all cams in the present invention are similarly merely correction cams. In this way, all elements, whose motion represents one or another signal, are driven principally from motors, only a small component of the driving force ever being obtained from a cam, and therefore these elements all have high torques. Another advantage obtained by the exclusive use of correction cams is that good scale factors may be maintained on such cams.

It will be understood that the usual friction clutches, limit stops, self-locking couplings, and so forth, which are generally incorporated in a director for the protection of equipment and for other incidental reasons, are to be employed in the present director, wherever necessary or desirable.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A smoothing and differentiating circuit comprising an input member actuated proportionately to data to be smoothed and differentiated, a first disc-ball carriage-and-cylinder variable speed device, cam means for compensating for the non-linearity in said variable speed device due to slip, including a cam, and a cam follower driven from said cam and positioning the ball carriage of said variable speed device, said cam being so laid out that the rate of rotation of the cylinder of said variable speed device is exactly proportional to the displacement of said cam, means for rotating said disc at a constant speed, a control element, means for positioning said control element in response to the difference of the positions of said input member and said cylinder, a second disc-ball carriage-and-cylinder variable speed device, means for rotating the disc of said second variable speed device at a constant speed, means for controlling the position of the ball carriage of said second variable speed device from said control element, and means for controlling the position of the ball carriage of said first variable speed device in response to the sum of the positions of said control element and the cylinder of said second variable speed device, whereby the cylinder of said first variable speed device is actuated proportionately to a smoothed version of said input data, and the cylinder of said second variable speed device is actuated proportionately to a smoothed version of the time derivative of said input data.

2. A smoothing and differentiating circuit comprising an input member and an output member to be synchronized to the average position of said input member, means for driving said output member, a control member for controlling the output of said driving means, means for actuating said control member in accordance with movements of said input, a variable speed device having a positionable control member and an output member, means for controlling the position of the control member of said variable speed device in accordance with the difference between the rates of said input and first-mentioned output members, means for further actuating said first mentioned control member in accordance with the displacement of the output member of said variable speed device, and means for varying a sensitivity constant of the circuit.

3. A smoothing and differentiating circuit comprising an input member and an output member, means for driving said output member, a positionable control for controlling the rate of said driving means, means for differentially positioning said control in accordance with the difference between the rates of said input and output members, a variable speed device having a positionable control member and an output member, means for controlling the position of the control member of said variable speed device in accordance with the difference between the rates of said input and first-mentioned output members, means for further actuating said first-mentioned control member in accordance with the displacement of the output member of said variable speed device, and means for varying a sensitivity constant of the circuit.

4. A smoothing and differentiating circuit comprising an input member and output member, means for driving said output member, a first positionable control member for controlling the rate of said driving means, a second control member for positioning said first control member, means for positioning said second control member in accordance with the difference between the displacement of said input member and the time integral of the movement of said output member, means for positioning said first control member in accordance with the sum of the displacement of said second control member and the time integral of the movement of said second control member, and means for varying a sensitivity constant of the circuit.

5. A smoothing and differentiating circuit comprising an input member actuated proportionately to data to be smoothed and differentiated, a first disc-ball carriage-and-cylinder-variable speed device, means for rotating said disc at a constant speed, a control element, means for positioning said control element in response to the difference of the speeds of rotation of said input member and said cylinder, a second disc-ball carriage-and-cylinder-variable speed device, means for rotating the disc of said second variable speed device at a constant speed, means for controlling the position of the ball carriage of said second variable speed device from said control element, and means for controlling the position of the ball carriage of said first variable speed device in response to the sum of the displacements of said control element and the cylinder of said second variable speed device, whereby the cylinder of said first variable speed device is actuated proportionately to a smoothed version of said input data, and the cylinder of said second variable speed device is actuated proportionately to a smoothed version of the time derivative of said input data, and means for altering the speed of said disc of said second variable speed device during operation of the circuit, whereby the dynamic characteristics of the circuit are altered.

6. A smoothing and differentiating circuit comprising an input member actuated proportionately to data to be smoothed and differentiated, a first disc-ball carriage-and-cylinder-variable speed device, means for rotating said disc at a constant speed, a control element, means for positioning said control element in response to the difference of the speeds of rotation of said input member and said cylinder, a second disc-ball carriage-and-cylinder-variable speed device, means for rotating the disc of said second variable speed device at a constant speed, means for controlling the position of the ball carriage of said second variable speed device from said control element, and means for controlling the position of the ball carriage of said first variable speed device in response to the sum of the displacements of said control element and the cylinder of said second variable speed device, whereby the cylinder of said first variable speed device is actuated proportionately to a smoothed version of said input data, and the cylinder of said second variable speed device is actuated proportionately to a smoothed version of the time derivative of said input data, and means for automatically decreasing the speed of said disc of said second variable speed device at a fixed time after the initiation of response of the circuit, whereby the smoothing characteristics of the circuit are thereafter improved.

7. A smoothing and differentiating circuit comprising an input member actuated proportionately to data to be smoothed and differentiated, a first disc-ball carriage-and-cylinder-variable speed device, means for rotating said disc at a constant speed, a control element, means for positioning said control element in response to the difference of the speeds of rotation of said input member and said cylinder, a second disc-ball carriage-and-cylinder-variable speed device, means for rotating the disc of said second variable speed device at a constant speed, means for controlling the position of the ball carriage of said second variable speed device from said control element, and means for controlling the position of the ball carriage of said first variable speed device in response to the sum of the displacements of said control element and the cylinder of said second variable speed device, whereby the cylinder of said first variable speed device is actuated proportionately to a smoothed version of said input data, and the cylinder of said second variable speed device is actuated proportionately to a smoothed version of the time derivative of said input data, and means for decreasing the speed of said disc of said second variable speed device during operation of the circuit, and means for automatically initiating the action of said last-named means at a fixed time after the initiation of response of the circuit, whereby the smoothing characteristics of the circuit are thereafter improved.

8. A smoothing and differentiating circuit comprising an input member actuated proportionately to data to be smoothed and differentiated, a first disc-ball carriage-and-cylinder-variable speed device, means for rotating said disc at a constant speed, a control element, means for positioning said control element in response to the difference of the speeds of rotation of said input member and said cylinder, a second disc-ball carriage-and-cylinder-variable speed device, means for rotating the disc of said second variable speed device at a constant speed, means for controlling the position of the ball carriage of said second variable speed device from said control element, and means for controlling the position of the ball carriage of said first variable speed device in response to the sum of the displacements of said control element and the cylinder of said second variable speed device, whereby the cylinder of said first variable speed device is actuated proportionately to a smoothed version of said input data, and the cylinder of said second variable speed device is actuated proportionately to a smoothed version of the time derivative of said input data, means for indicating the deviation of said control element from its zero displacement position, and means for altering the speed of said disc of said second variable speed device during the process of solution, whereby the smoothing characteristics of the circuit may be varied at any desired indication of said control element.

9. A smoothing and differentiating circuit comprising an input member actuated proportionately to data to be smoothed and differentiated, a first variable speed device having an actuating member and an output variable rate member, a control element, means for positioning said control element in response to the difference of the positions of said input member and said output variable rate member, a second variable speed device also having an actuating member and an output variable rate member, means for controlling the position of said actuating member of said second variable speed device from said control element, and means for positioning said actuating member of said first variable speed device in response to the sum of the positions of said control element and said output member of said second variable speed device, whereby the output member of said first variable speed device is actuated proportionately to a smoothed version of said input data, and the output member of said second variable speed device is actuated proportionately to a smoothed version of the time derivative of said input data, and means for indicating the deviation of said control element from its zero displacement position, whereby the proximity of the circuit to the condition of full response is indicated.

10. A smoothing and differentiating circuit comprising an input member actuated proportionately to data to be smoothed and differentiated, a first variable speed device having an actuating member and an output variable rate member, a control element, means for positioning said control element in response to the difference of the positions of said input member and said output variable rate member, a second variable speed device also having an actuating member and an output variable rate member, means for controlling the position of said actuating member of said second variable speed device from said control element, and means for positioning said actuating member of said first variable speed device in response to the sum of the positions of said control element and said output member of said second variable speed device, whereby the output member of said first variable speed device is actuated proportionately to a smoothed version of said input data, and the output member of said second variable speed device is actuated proportionately to a smoothed version of the time derivative of said input data, and means for altering the proportionality factor between the displacement of said actuating member of said second variable speed device and the rate of said output member of said second variable speed device during operation of the circuit, whereby the dynamic characteristics of the circuit are altered.

11. A smoothing and differentiating circuit comprising an input member actuated proportionately to data to be smoothed and differentiated, a first variable speed device having an actuating member and an output variable rate member, a control element, means for positioning said control element in response to the difference of the positions of said input member and said output variable rate member, a second variable speed device also having an actuating member and an output variable rate member, means for controlling the position of said actuating member of said second variable speed device from said control element, and means for positioning said actuating member of said first variable speed device in response to the sum of the positions of said control element and said output member of said second variable speed device, whereby the output member of said first variable speed device is actuated proportionately to a smoothed version of said input data, and the output member of said second variable speed device is actuated proportionately to a smoothed version of the time derivative of said input data, and means for altering one of the circuit constants, whereby the dynamic characteristics of the circuit are altered.

12. A smoothing and differentiating circuit comprising an input member actuated proportionately to data to be smoothed and differentiated, a first variable speed device having an actuating member and an output variable rate member, a control element, means for positioning said control element in response to the difference of the positions of said input member and said output variable rate member, a second variable speed device also having an actuating member and an output variable rate member, means for controlling the position of said actuating member of said second variable speed device from said control element, and means for positioning said actuating member of said first variable speed device in response to the sum of the positions of said control element and said output member of said second variable speed device, whereby the output member of said first variable speed device is actuated proportionately to a smoothed version of said input data, and the output member of said second variable speed device is actuated proportionately to a smoothed version of the time derivative of said input data, and means for automatically altering the proportionality factor between the displacement of said actuating member of said second variable speed device and the rate of said output member of said second variable speed device at a fixed time after the initiation of response of the circuit, whereby the smoothing characteristics of the circuit may thereafter be improved.

13. A smoothing and differentiating circuit comprising an input member actuated proportionately to data to be smoothed and differentiated, a first variable speed device having an actuating member and an output variable rate member, a control element, means for positioning said control element in response to the difference of the positions of said input member and said output variable rate member, a second variable speed device also having an actuating member and an output variable rate member, means for controlling the position of said actuating member of said second variable speed device from said control element, and means for positioning said actuating member of said first variable speed device in response to the sum of the positions of said control element and said output member of said second variable speed device, whereby the output member of said first variable speed device is actuated proportionately to a smoothed version of said input data, and the output member of said second variable speed device is actuated proportionately to a smoothed version of the time derivative of said input data, and means for automatically altering one of the circuit constants at a fixed time after the initiation of response of the circuit, whereby the dynamic characteristics of the circuit may be improved.

14. A smoothing and differentiating circuit comprising an input member actuated proportionately to data to be smoothed and differentiated, a first variable speed device having an actuating member and an output variable rate member, a control element, means for positioning said control element in response to the difference of the positions of said input member and said output variable rate member, a second variable speed device also having an actuating member and an output variable rate member, means for controlling the position of said actuating member of said second variable speed device from said control element, and means for positioning said actuating member of said first variable speed device in response to the sum of the positions of said control element and said output member of said second variable speed device, whereby the output member of said first variable speed device is actuated proportionately to a smoothed version of said input data, and the output member of said second variable speed device is actuated proportionately to a smoothed version of the time derivative of said input data, means for altering the proportionality factor between the displacement of said actuating member of said second variable speed device and the speed of said output member of said second variable speed device during the process of solution, and means for automatically initiating the action of said last-named means at a fixed period after the initiation of response of the circuit, whereby the smoothing characteistics of the circuit may be thereafter improved.

15. A smoothing and differentiating circuit comprising an input member actuated proportionately to data to be smoothed and differentiated, a first variable speed device having an actuating member and an output variable rate member, a control element, means for positioning said control element in response to the difference of the positions of said input member and said output variable rate member, a second variable speed device also having an actuating member and an output variable rate member, means for controlling the position of said actuating member of said second variable speed device from said control element, and means for positioning said actuating member of said first variable speed device in response to the sum of the positions of said control element and said output member of said second variable speed device, whereby the output member of said first variable speed device is actuated proportionately to a smoothed version of said input data, and the output member of said second variable speed device is actuated proportionately to a smoothed version of the time derivative of said input data, means for altering one of the circuit constants during the process of solution, and means for automatically initiating the action of said last-named means at a fixed period after the initiation of response of the circuit, whereby the smoothing characteristics of the circuit may be thereafter improved.

16. A smoothing and differentiating circuit comprising an input member actuated proportionately to data to be smoothed and differentiated, a first variable speed device having an actuating member and an output variable rate member, a control element, means for positioning said control element in response to the difference of the positions of said input member and said output variable rate member, a second variable speed device also having an actuating member and an output variable rate member, means for controlling the position of said actuating member of said second variable speed device from said control element, and means for positioning said actuating member of said first variable speed device in response to the sum of the positions of said control element and said output member of said second variable speed device, whereby the output member of said first variable speed device is actuated proportionately to a smoothed version of said input data, and the output member of said second variable speed device is actuated proportionately to a smoothed version of the time derivative of said input data, means for indicating the deviation of said control element from its zero displacement position, and means for altering the proportionality factor between the displacement of said actuating member of said second variable speed device and the speed of said output member of said second variable speed device, whereby the smoothing characteristics of said circuit may be improved after the circuit has substantially responded to said input data.

17. A smoothing and differentiating circuit comprising an input member actuated proportionately to data to be smoothed and differentiated, a first disc-ball carriage-and-cylinder-variable speed device, means for rotating said disc at a constant speed, a control element, means for positioning said control element in response to the difference of the speeds of rotation of said input member and said cylinder, a second disc-ball carriage-and-cylinder-variable speed device, means for rotating the disc of said second variable speed device at a constant speed, means for controlling the position of the ball carriage of said second variable speed device from said control element, and means for controlling the position of the ball carriage of said first variable speed device in response to the sum of the displacements of said control element and the cylinder of said second variable speed device, whereby the cylinder of said first variable speed device is actuated proportionately to a smoothed version of said input data, and the cylinder of said second variable speed device is actuated proportionately to a smoothed version of the time derivative of said input data, and means for indicating the deviation of said control element from its zero displacement position, whereby the proximity of the circuit to the condition of full response is indicated.

18. A smoothing and differentiating circuit comprising an input member and an output member to be synchronized to the average position of said input member, means for driving said output member, a positionable controller for controlling the rate of said driving means, a second driving means having a positionable controller for controlling the output rate thereof, means for actuating both of said controllers in accordance with the difference between movements of said input and output members, means for additionally positioning said first-mentioned controller by the output of said second driving means, and means for varying the sensitivity of said second driving means.

19. A smoothing and differentiating circuit comprising an input member and an output member to be synchronized to the average position of said input member, means for driving said output member, a positionable controller for controlling the rate of said driving means, a second driving means having a positionable controller for controlling the output rate thereof, actuating means for actuating both of said controllers in accordance with the difference between movements of said input and output members, means for connecting the output of said second driving means with the first-mentioned controller whereby said first-mentioned controller is positioned by said actuating means and the output of said second driving means, and means for varying the sensitivity of said second driving means.

20. A smoothing and differentiating circuit comprising an input member and an output member to be synchronized to the average position of said input member, means for driving said output member, a positionable controller for controlling the rate of said driving means, a second driving means having a positionable controller for controlling the output rate thereof, means for actuating both of said controllers in accordance with the difference between the rates of said input and output members, means for additionally positioning said first-mentioned controller by the output of said second driving means, and means for varying a sensitivity constant of the circuit.

21. A smoothing and differentiating circuit comprising an input member and an output member to be synchronized to the average position of said input member, variable speed means for driving said output member, a positionable controller for controlling the rate of said driving means, a second variable speed driving means having a positionable controller for controlling the output rate thereof, a member positionable in accordance with the difference between the rates of said input and output members, means for positioning said second mentioned controller by said member, means for differentially combining the movements of said member and the output of said second driving means, the output of said differential combining means being connected to position said first mentioned controller, and means for varying the sensitivity of said second variable speed driving means.

22. A smoothing and differentiating circuit comprising an input member and an output member to be synchronized to the average position of said input member, variable speed means controlled by said input member for driving said output member, means for indicating the lag between said input and output members, and means for decreasing the sensitivity of said variable speed means, whereby the smoothing characteristics of said circuit may be improved after the lag between said input and output members has substantially disappeared.

23. A smoothing and differentiating circuit comprising an input member and an output member to be synchronized to the average position of said input member, variable speed means controlled by said input member for driving said output member, means for measuring the lag between said input and output members, and means for varying the sensitivity of said circuit, whereby the smoothing characteristics of said circuit may be improved after the lag between said input and output members due to comparatively large changes in the rate of said input member has substantially disappeared.

DAVID J. CAMPBELL.
WILLIS G. WING.

REFERENCES CITED

The following references are of record in the file of this patent:

UNITED STATES PATENTS

| Number | Name | Date |
|---|---|---|
| 1,999,368 | Myers et al. | Apr. 30, 1935 |
| 2,065,303 | Chafee et al. | Dec. 22, 1936 |
| 2,136,213 | Hodgman | Nov. 8, 1938 |
| 2,206,875 | Chafee et al. | July 9, 1940 |
| 2,209,254 | Ahnger | July 23, 1940 |
| 2,251,155 | Neuhaus | July 29, 1941 |
| 2,271,688 | Forster et al. | Feb. 3, 1942 |